United States Patent
Nojiri et al.

(10) Patent No.: US 9,256,099 B2
(45) Date of Patent: Feb. 9, 2016

(54) POLARIZER, POLARIZING PLATE USING THE SAME, LIQUID CRYSTAL DISPLAY DEVICE, AND METHOD OF MANUFACTURING POLARIZING PLATE

(71) Applicant: FUJIFILM Corporation, Tokyo (JP)

(72) Inventors: Mayumi Nojiri, Kanagawa (JP); Takahiro Ohno, Kanagawa (JP); Nobutaka Fukagawa, Kanagawa (JP); Yu Naito, Kanagawa (JP); Hiroyuki Ishikawa, Kanagawa (JP); Naoya Shimoju, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/190,943

(22) Filed: Feb. 26, 2014

(65) Prior Publication Data

US 2014/0242300 A1    Aug. 28, 2014

(30) Foreign Application Priority Data

Feb. 27, 2013 (JP) ................. 2013-036539
Feb. 5, 2014 (JP) ................. 2014-020394

(51) Int. Cl.
*C09K 19/00* (2006.01)
*G02F 1/1335* (2006.01)
(Continued)

(52) U.S. Cl.
CPC ........ *G02F 1/133528* (2013.01); *C08K 5/3462* (2013.01); *C08L 1/10* (2013.01); *C08L 1/12* (2013.01); *G02B 5/3033* (2013.01); *Y10T 428/1041* (2015.01)

(58) Field of Classification Search
CPC .......... G02B 1/08; G02B 5/30; G02B 5/3025; G02B 5/3033; Y10T 428/10; Y10T 428/1036; Y10T 428/1041; C08J 5/18; G02F 1/133528; G02F 1/133533
USPC ........................ 428/1.1, 1.3, 1.31; 427/163.1; 359/487.01, 487.02; 252/585; 349/96; 106/170.1
See application file for complete search history.

(56) References Cited

U.S. PATENT DOCUMENTS

2007/0009676 A1  1/2007  Tamagawa et al.
2011/0134374 A1  6/2011  Fukagawa et al.
(Continued)

FOREIGN PATENT DOCUMENTS

JP   03-045905 A   2/1991
JP   2002-236212   8/2002
(Continued)

OTHER PUBLICATIONS

Final Office Action issued by USPTO on Dec. 18, 2014 in connection with co-pending U.S. Appl. No. 13/749,043.
(Continued)

*Primary Examiner* — Ruiyun Zhang
(74) *Attorney, Agent, or Firm* — Jean C. Edwards, Esq.; Edwards Neils PLLC

(57) ABSTRACT

Provided is a polarizer durable against high-temperature and high-humidity conditions, small in changes in the single plate transmittance, and a liquid crystal display device. A polarizer including a polyvinyl alcohol-based resin, a dichroic colorant, and a compound, etc. represented by the formula (1) below, the content of the compound represented by the formula (1) being 0.01 to 30 parts by mass relative to 100 parts by mass of the polyvinyl alcohol-based resin. In the formula (1) , each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group or $C_{6-20}$ aromatic group, and $R^5$ represents a substituent.

Formula (1)

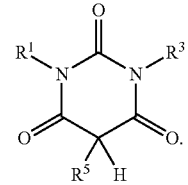

6 Claims, 1 Drawing Sheet

(51) Int. Cl.
    *G02B 5/30*     (2006.01)
    *C08L 1/10*     (2006.01)
    *C08L 1/12*     (2006.01)
    *C08K 5/3462*     (2006.01)

(56) References Cited

U.S. PATENT DOCUMENTS

| | | | |
|---|---|---|---|
| 2011/0273646 A1 | 11/2011 | Fukagawa et al. | |
| 2012/0088041 A1* | 4/2012 | Fukagawa et al. | 428/1.33 |
| 2013/0189449 A1 | 7/2013 | Fukagawa et al. | |

FOREIGN PATENT DOCUMENTS

| | | |
|---|---|---|
| JP | 2003-207620 | 7/2003 |
| JP | 2005-105066 | 4/2005 |
| JP | 2006-163082 | 6/2006 |
| JP | 2007-047536 A | 2/2007 |
| JP | 2009-037223 | 2/2009 |
| JP | 2009-086362 | 4/2009 |
| JP | 2011-118135 A | 6/2011 |
| JP | 2011-126968 | 6/2011 |
| JP | 2011-237580 A | 11/2011 |
| JP | 2011237580 A * | 11/2011 |
| JP | 2012-014148 | 1/2012 |
| JP | 2012-098698 | 5/2012 |
| WO | 2007/007565 A1 | 1/2007 |
| WO | WO-2009-107405 | 9/2009 |
| WO | WO-2012-169629 | 12/2012 |

OTHER PUBLICATIONS

Notice of Reasons for Rejection, issued by Japanese Patent Office on Feb. 10, 2015, in connection with Japanese Patent Application No. 2012-252635.
Office Action issued by the Japanese Patent Office on Jan. 27, 2015, in connection with Japanese Patent Application No. 2014-020395.
Office Action issued by the Japanese Patent Office on Feb. 24, 2015, in connection with Japanese Patent Application No. 2014-020394.
Non-Final Office Action issued by USPTO on Jul. 8, 2014 in connection with co-pending U.S. Appl. No. 13/749,043.

* cited by examiner

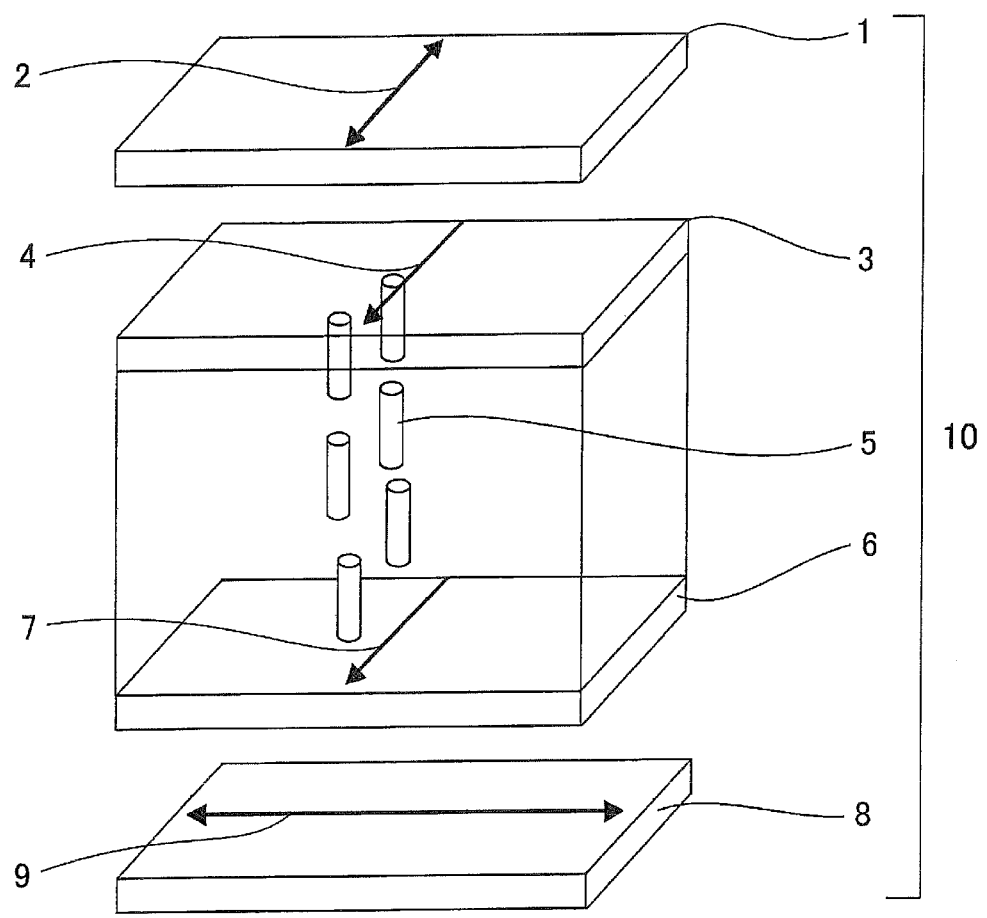

POLARIZER, POLARIZING PLATE USING THE SAME, LIQUID CRYSTAL DISPLAY DEVICE, AND METHOD OF MANUFACTURING POLARIZING PLATE

CROSS-REFERENCE TO RELATED APPLICATIONS

The present application claims the benefit of priority from Japanese Patent Application Nos. 2013-036539, filed on Feb. 27, 2013 and 2014-020394, filed on Feb. 5, 2014, the contents of all of which are herein incorporated by reference in their entirety.

TECHNICAL FIELD

The present invention relates to a polarizer, and also to a polarizing plate having the polarizer, a liquid crystal display device, and a method of manufacturing the polarizing plate.

BACKGROUND ART

Liquid crystal display device has been disseminated as a space-saving image display device with low power consumption, and has been expanding its applications year by year.

The liquid crystal display device is generally configured by providing polarizing plates on both sides of a liquid crystal cell. The polarizing plate functionally allows only light having a certain directionality of plane of polarization to pass therethrough, and performance of the polarizing plate largely affects performance of the liquid crystal display device. The polarizing plate is generally configured by a polarizer which is typically composed of an oriented polyvinyl alcohol film having iodine or dye adhered thereto, and translucent protective films bonded to the front and back surfaces of the polarizer.

With recent expanding applications of the liquid crystal display device, there has been an increasing trend of large-sized, high-definition applications such as television set, and this has further pushed up a level of required quality of the polarizing plate. In particular, large-sized, high-definition liquid crystal display devices have increasingly been used outdoors and under various severe environments than before. From this point of view, in recent years, the polarizing plate used for the liquid crystal display device has been strongly demanded to improve the durability of the polarizer under high-temperature and high-humidity conditions.

JP-A-2011-237580 describes that the durability of the polarizer, under high-temperature and high-humidity conditions, was improved by mixing a specific organic acid into the polarizer.

JP-A-2011-118135 describes addition of barbituric acid to the protective film.

SUMMARY OF THE INVENTION

Technical Problem

While the polarizer described in JP-A-2011-237580 is the excellent one, further efforts have been required to improve performances of the polarizer per se, in the recent increasingly demanding situation. Meanwhile the method of adding the organic acid to the polarizing plate protective film, described in JP-A-2011-118135, is adoptable only to a specific category of polarizing plate protective film, since the low-molecular-weight organic acid will vaporize in the process of melting a source material such as cyclic olefin or acrylic resin applied by melt casting, and will not remain in the film.

The present invention was conceived to solve the problems described above, and an object thereof is to provide a polarizer intrinsically having high performances which are well retained even under high-temperature and high-humidity conditions, and applicable to a wide variety of polarizing plate protective films.

The object is also to provide a polarizing plate having such polarizer, and a liquid crystal display device.

Solution to Problem

The present inventors conducted thorough investigations aiming at solving the above-described problems, and found out that, by containing a predetermined amount of a predetermined compound having a skeleton of barbituric acid, the polarizer became intrinsically large in the transmittance, largely suppressed in time-dependent elevation of the cross transmittance under high moisture, and small in changes in the single plate transmittance. The findings led us to complete the present invention. More specifically, the problems described above were solved by the mean <1> below, and preferably by the means <2> to <12>.

<1> A polarizer comprising a polyvinyl alcohol-based resin, a dichroic colorant, and at least one species selected from compound represented by the formula (1) below, compound represented by the formula (1-2) below, hydrate of the compounds, solvate of the compounds, and salt of the compounds, the total content of the compound represented by the formula (1), the compound represented by the formula (1-2), the hydrate of the compounds, the solvate of the compounds, and the salt of the compounds being 0.01 to 30 parts by mass relative to 100 parts by mass of the polyvinyl alcohol-based resin:

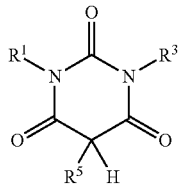

Formula (1)

in the formula (1), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group or $C_{6-20}$ aromatic group, and $R^5$ represents a substituent;

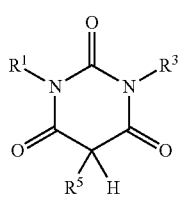

Formula (1-2)

in the formula (1-2), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group, or, $C_{6-20}$ aromatic group, and $R^5$ represents a substituent; where at least one of $R^1$, $R^3$ and $R^5$ is a water-soluble group, or contains a water-soluble group, or both of $R^1$ and $R^3$ represent a hydrogen atom.

<2> The polarizer of <1>, wherein in the compound represented by the formula (1), the compound represented, by the formula (1-2), the hydrate of the compounds, the solvate of the compounds, and the salt of the compounds, $R^5$ represents an alkyl group, aryl group, or aralkyl group.

<3> The polarizer of <1> or <2>, wherein each of the compound represented by the formula (1), the compound represented by the formula (1-2), the hydrate of the compounds, the solvate of the compound, and the salt of the compounds is a compound represented by the formula (1), with $R^5$ being a substituent having an aromatic ring, and showing a polar effect.

<4> The polarizer of <1> or <2>, wherein in each of the compound represented by the formula (1), the compound represented by the formula (1-2), the hydrate of the compounds, the solvate of the compounds, and the salts of the compounds, $R^5$ represents a substituent having an aromatic ring, and showing a polar effect.

<5> The polarizer of any one of <1> to <4>, wherein $R^5$ represents an aryl group or aralkyl group.

<6> The polarizer of any one of <1> to <5>, wherein $R^5$ represents a phenyl group or benzyl group.

<7> The polarizing plate having a protective film on at least one surface of the polarizer described in <1> to <6>, and a protective film formed on at least one surface thereof.

<8> The polarizing plate of <7>, wherein the protective film is a cellulose acylate film.

<9> The liquid crystal display device comprising the polarizing plate described in <7> or <8>.

<10> A method of manufacturing a polarizer, the method comprising:

making a polyvinyl alcohol-based resin into a film;

stretching the polyvinyl alcohol-based resin film;

dyeing the stretched polyvinyl alcohol-based resin film with a dichroic colorant; and applying at least one species selected from compound represented by the formula (1), compound represented by the formula (1-2), hydrate of the compounds, solvate of the compounds, and salt of the compounds in the total content of 0.01 to 30 parts by mass per 100 parts by mass of the polyvinyl alcohol-based resin;

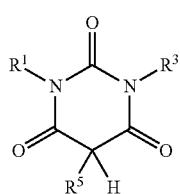

Formula (1)

in the formula (1), each of $R^1$ and $R^3$ independently represents a hydrogen atom, $C_{1-20}$ straight-chain alkyl group, $C_{3-20}$ branched alkyl group, $C_{2-20}$ cycloalkyl group, $C_{2-20}$ alkenyl group or $C_{6-20}$ aromatic group, and $R^5$ represents a substituent;

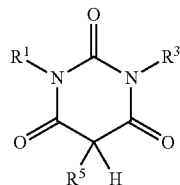

Formula 1-2 in the formula (1-2), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group, or $C_{6-20}$ aromatic group, and $R^5$ represents a substituent; where at least one of $R^1$, $R^3$ and $R^5$ is a water-soluble group, or contains a water-soluble group, or both of $R^1$ and $R^3$ represent a hydrogen atom.

<11> The method of manufacturing a polarizer of <10>, wherein the applying is, in the making of the polyvinyl alcohol-based resin film, performed by using a polyvinyl alcohol-based resin solution containing 0.0.1 to 30 parts by mass of the compounds per 100 parts by mass of the polyvinyl alcohol-based resin.

<12> The method of manufacturing a polarizer of <10> or <11>, wherein each of the compound represented by the formula (1), the compound represented by the formula (1-2), the hydrate of the compounds, the solvate of the compounds, and the salt of the compounds is a compound represented by the formula (1), with $R^5$ being a substituent having an aromatic ring, and showing a polar effect.

Advantageous Effects of Invention

According to the present invention, it now became possible to provide a polarizer intrinsically high in the performance, well durable against high-temperature and high-humidity conditions, and adoptable to a wide variety of polarizing plate protective film.

BRIEF DESCRIPTION OF DRAWINGS

FIG. 1 is a schematic drawing illustrating an example of the liquid crystal display device of the present invention.

DESCRIPTION OF EMBODIMENTS

The present invention will be detailed below. Note in this specification that the wording "to" with preceding and succeeding numerals is used for indicating a numerical range including the lower and upper limits thereof respectively given by these numerals.

In this specification, any notation of group (atomic group) preceded by neither "substituted" nor "unsubstituted" is understood to encompass both of those having no substituent and having substituent. For example, a notation of "alkyl group" is understood to encompass not only alkyl group having no substituent (unsubstituted alkyl group), but also alkyl group having substituent (substituted alkyl group).

<Polarizer>

The polarizer of the present invention contains a polyvinyl alcohol-based resin, a dichroic colorant, and at least one of compound represented by the formula (1), compound represented by the formula (1-2) below, hydrate of the compounds, solvate of the compounds, and salt of the compounds (these compounds may occasionally be referred to as "compound, etc. represented by the formula (1)", hereinafter), and the total content of the compounds represented by the formula (1), the compound represented by the formula (1-2), the hydrate of the compounds, the solvate of the compounds, and the salt of the compounds is 0.01 to 30 parts by mass relative to the polyvinyl alcohol-based resin.

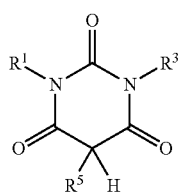

Formula (1)

In the formula (1), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group or $C_{6-20}$ aromatic group, and $R^5$ represents a substituent;

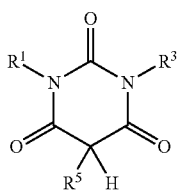

Formula (1-2)

In the formula (1-2), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group, or $C_{6-20}$ aromatic group, and $R^5$ represents a substituent; where at least one of $R^1$, $R^3$ and $R^5$ is a water-soluble group, or contains a water-soluble group, or both of $R^1$ and $R^3$ represent a hydrogen atom.

One possible event relevant to the subject of the present invention is photo-degradation. A known mechanism causing the photo-degradation is that a strong energy beam such as ultraviolet radiation is absorbed by an iodine complex in the polarizing plate, and then decomposes the resin.

The present inventors found out, after our thorough investigations aimed at solving the above-mentioned problems, that by containing a predetermined amount of a compound having a barbituric acid skeleton with a predetermined structure, the polarizer per se will have a high transmittance, will be largely suppressed from increasing in the cross transmittance with time under high temperatures and high humidity, and will be small in changes in the single plate transmittance. The findings led us to complete the present invention.

It was also found that the effects of the present invention were fully exhibited, particularly when $R^5$ in the formula (1) or the (1-2) in the present invention represents a substituent having an aromatic ring and showing a polar effect. This is supposedly because, in $R^5$ in the formula (1) or in the formula (1-2) in the present invention, a carbon atom having bound thereon the substituent, represented, which contains an aromatic ring and shows a polar effect, relates to a mechanism of scavenging and stabilizing iodine radical produced by energy beam such as ultraviolet radiation. What is better, barbituric acid which configures the skeleton of the formula (1) or the formula (1-2) shows acidity enough to contribute to stabilize the polarizer, and this ensures a distinct effect. Moreover, the compound represented by the formula (1) functions as an effective mediator of a reaction in which iodine ions (I⁻) are oxidized by oxygen in the air to produce iodine molecule ($I_2$), so as to promote generation of the iodine complex ($I_3^-$/PVA, $I_5^-$/PVA), to thereby exhibit an effect of increasing the cross transmittance of the polarizing plate. In short, by containing the compound represented by the formula (1) or the formula (1-2) in the polarizer, the polarizer of the present invention, when used in the polarizing plate, is distinctively improved in the durability of the polarizer and in the single plate transmittance, even after kept for a while under high-temperature and high-humidity conditions.

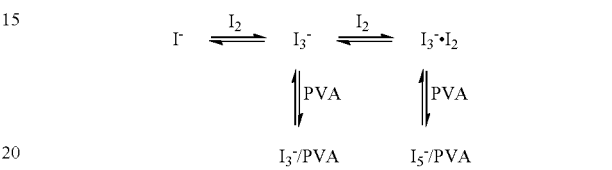

<<Compound Represented by Formula (1)>>

The polarizer of the present invention generally contains the compound represented by the formula (1).

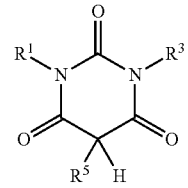

(In the formula (1), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group or $C_{6-20}$ aromatic group, and $R^5$ represents a substituent.)

Preferable ranges of $R^1$ and $R^3$ in the formula (1) will be explained below.

The $C_{1-20}$ straight-chain alkyl group or $C_{3-20}$ branched alkyl group is preferably a $C_{1-10}$ straight-chain alkyl group or $C_{3-20}$ branched alkyl group, more preferably a $C_{1-5}$ straight-chain alkyl group or $C_{3-5}$ branched alkyl group, furthermore preferably a $C_{1-3}$ straight-chain alkyl group, and particularly a methyl group or ethyl group.

The $C_{3-20}$ cycloalkyl group is preferably a $C_{3-10}$ cycloalkyl group, and more preferably a $C_{4-8}$ cycloalkyl group. The cycloalkyl group is specifically exemplified by cyclopropyl group, cyclopentyl group and cyclohexyl group, wherein cyclohexyl group is particularly preferable. The cycloalkyl group herein means a cyclic alkyl group.

The $C_{2-20}$ alkenyl group is preferably a $C_{2-10}$ alkenyl group, and more preferably a $C_{2-5}$ alkenyl group.

The $C_{6-20}$ aromatic group may be an aromatic hydrocarbon group or aromatic heterocyclic group, where the aromatic hydrocarbon group is more preferable. The aromatic hydrocarbon group is preferably a phenyl group or naphthyl group, where phenyl group is more preferable.

Each of $R^1$ and $R^3$ may have a substituent. The substituent is not specifically limited, and is exemplified by alkyl group (preferably $C_{1-10}$ ones, such as methyl group, ethyl group, isopropyl group, t-butyl group, pentyl group, heptyl group, 1-ethylpentyl group, benzyl group, 2-ethoxyethyl group, 1-carboxymethyl group, etc.), alkenyl group (preferably $C_{2-20}$ ones, such as vinyl group, allyl group, oleyl group, etc.), alkynyl group (preferably $C_{2-20}$ ones, such as ethynyl group, butadienyl group, phenylethynyl group, etc.), cycloalkyl group (preferably $C_{3-20}$ ones, such as cyclopropyl group, cyclopentyl group, cyclohexyl group, 4-methylcyclohexyl group, etc.), aryl group (preferably $C_{6-26}$ ones, such as phenyl group, 1-naphthyl group, 4-methoxyphenyl group, 2-chlorophenyl group, 3-methylphenyl group, etc.), heterocyclic group (preferably $C_{0-20}$ ones, preferably having oxygen atom, nitrogen atom or sulfur atom as a hetero atom composing the ring, may be 5- or 6-membered ring occasionally condensed with a benzene ring or heterocycle, the ring may be saturated ring, unsaturated ring or aromatic ring, such as 2-pyridyl group, 4-pyridyl group, 2-imidazolyl group, 2-benzoimidazolyl group, 2-thiazolyl group, 2-oxazolyl group, etc.), alkoxy group (preferably $C_{1-20}$ ones, such as methoxy group, ethoxy group, isopropyloxy group, benzyloxy group, etc.), aryloxy group (preferably $C_{6-26}$ ones, such as phenoxy group, 1-naphthyloxy group, 3-methylphenoxy group, 4-methoxyphenoxy group, etc.), alkylthio group (preferably $C_{1-20}$ ones, such as methylthio group, ethylthio group, isopropylthio group, benzylthio group, etc.), arylthio group (preferably $C_{6-26}$ ones, such as phenylthio group, 1-naphthylthio group, 3-methylphenylthio group, 4-methoxyphenylthio group, etc.), acyl group (containing alkylcarbonyl group, alkenylcarbonyl group, arylcarbonyl group or heterocyclic carbonyl group, preferably $C_{20}$ or shorter, such as acetyl group, pivaloyl group, acryloyl group, methacryloyl group, benzoyl group, nicotinoyl group, etc.), aryloylalkyl group, alkoxycarbonyl group (preferably $C_{2-20}$ ones, such as ethoxycarbonyl group, 2-ethylhexyloxycarbonyl group, etc.), aryloxycarbonyl group (preferably $C_{7-20}$ ones, such as phenyloxycarbonyl group, naphthyloxycarbonyl group, etc.), amino group (containing amino group, alkylamino group, arylamino group or heterocyclic amino group, preferably $C_{0-20}$ ones, such as amino group, N,N-dimethylamino group, N,N-diethylamino group, N-ethylamino group, anilino group, 1-pyrrolidinyl group, piperidino group, morphonyl group, etc.), sulfonamide group (preferably $C_{0-20}$ ones, such as N,N-dimethylsulfonamide group, N-phenylsulfonamide group, etc.), sulfamoyl group (preferably $C_{0-20}$ ones, such as N,N-dimethylsulfamoyl group, N-phenylsulfamoyl group, etc.), acyloxy group (preferably $C_{1-20}$ ones, such as acetyloxy group, benzoyloxy group, etc.), carbamoyl group (preferably $C_{1-20}$ ones, such as N,N-dimethylcarbamoyl group, N-phenylcarbamoyl group, etc.), acylamino group (preferably $C_{1-20}$ ones, such as acetylamino group, acryloylamino group, benzoylamino group, nicotinamide group, etc.), cyano group, hydroxy group, mercapto group, and halogen atom (for example, fluorine atom, chlorine atom, bromine atom, iodine atom, etc.). The substituents which may be owned by $R^1$ and $R^3$ may further have the above-described substituents.

Among the above-described substituents which may be owned by $R^1$ and $R^3$, preferable are alkyl group, aryl group, alkoxy group and acyl group.

Preferable examples of the compounds represented by the formula (1) are the followings.

Compounds with at least one of $R^1$, $R^3$ and $R^5$ having a substituent showing a polar effect.

Compounds with either $R^1$ or $R^3$ representing an aralkyl group

Aralkyl group means alkyl group having aryl group(s) substituted thereon. Among the aralkyl groups, those having one or two aryl groups substituted on the alkyl group are preferable (two aryl groups, if any, preferably substitute on the same carbon atom). Alkyl group may also have aryl group and acyl group (preferably aryloyl group) substituted thereon.

Compounds with either $R^1$ or $R^3$ representing a cycloalkyl group-containing group which is preferably a cycloalkyl group Compounds with $R^1$ and $R^3$ representing a hydrogen atom, in particular with $R^1$ and $R^3$ representing a hydrogen atom, and $R^5$ representing a $C_{1-3}$ alkyl group $R^5$ represents a substituent. The substituent is represented by those previously enumerated as the substituents owned by $R^1$ and $R^3$, without special limitation. $R^5$ is preferably an alkyl group (preferably, $C_{1-3}$ alkyl group), aryl group, or aralkyl group, more preferably an aryl group or aralkyl group, and furthermore preferably a phenyl group or benzyl group.

In the present invention, it is particularly preferable that $R^5$ is a substituent having an aromatic ring and showing a polar effect. These groups may further be substituted by a substituent. The substituent having an aromatic ring and showing a polar effect represented by $R^5$ preferably has a structure showing a polar effect, so as to contribute to scavenge and stabilize the radicals. While the structure showing a polar effect may be embodied by any substituent showing a polar effect, $R^5$ now preferably represents a substituent having an aromatic ring and showing a polar effect.

This sort of substituent having an aromatic ring and showing a polar effect is preferably a $C_{6-20}$ aromatic group or $C_{7-20}$ aralkyl group, more preferably a $C_{6-14}$ aromatic group or $C_{7-15}$ aralkyl group, and still more preferably a $C_{6-10}$ aromatic group or $C_{7-11}$ aralkyl group. The number of carbon atoms referred to herein represents the total number of carbon atoms. The aralkyl group is a compound configured by an alkyl group substituted by aryl group(s). Among the aralkyl groups, those having one or two aryl groups on a single alkyl group are preferable (two aryl groups, if exist, preferably substitute on the same carbon atom.) The substituent having an aromatic ring and showing a polar effect is exemplified by phenyl group, naphthyl group, anthracenyl group, benzyl group, and diphenylmethyl group.

$R^5$ is exemplified by phenyl group, p-chlorophenyl group, p-tolyl group, benzyl group, ethylphenyl group, m-tolyl group, p-methoxyphenyl group, p-trifluoromethylphenyl group, p-methylbenzyl group, diphenylmethyl group, and methylbenzoyl phenylmethyl group.

<<Compound Represented by Formula (1-2)>>

As described above, in the present invention, the compound represented by the formula (1-2) is usable in place of the compound represented by the formula (1), or together with the compound represented by the formula (1). By using the compound represented by the formula (1-2), the compatibility with polyvinyl alcohol resin may be improved. As the barbituric acid in the present invention, the compound represented by the formula (1-2) is exemplified by a compound with at least one of $R^1$, $R^3$ and $R^5$ representing a water-soluble group, or compounds substituted with a water-soluble group. Any other moieties are synonymous to those in the formula (1), again with the same preferable ranges.

The water-soluble group is a group contributive to water solubility of the compound represented by the formula (1-2), and is exemplified by sulfo group (or salt thereof), carboxy group (or salt thereof), hydroxy group, mercapto group, amino group, ammonio group, sulfonamide group, acylsulfamoyl group, sulfonylsulfamoyl group, activated methine group, and substituent containing any of these groups. Preferable examples include sulfo group (or salt thereof), carboxy group (or salt thereof), hydroxy and amino group.

The carboxy group, sulfonamide group and sulfo group may exist in the form of salt, wherein examples of the counter ion which forms the salt include ammonium ion, alkaline metal ion (for example, lithium ion, sodium ion, potassium ion) and organic cation (for example, tetramethylammonium ion, tetramethylguanidium ion, tetramethylsulfonium ion). Among these counter ions, alkali metal ion is preferable.

In one embodiment in which the compound, usable in the present invention and represented by the formula (1-2), is given water solubility, both of $R^1$ and $R^3$ may be a hydrogen atom. With this configuration, the water solubility is improved.

<<Hydrate, Solvate or Salt>>

In the present invention, each of the compound represented by the formula (1) and the compound represented by the formula (1-2) may be used in the form of hydrate, solvate or salt. In the present invention, the hydrate may contain organic solvent, and the solvate may contain water. In other words, the "hydrate" and "solvate" include "mixed solvate" containing both of water and organic solvent.

Examples of the solvent possibly contained in the solvate include any of general organic solvents. Specific examples include alcohols (such as methanol, ethanol, 2-propanol, 1-butanol, 1-methoxy-2-propanol and t-butanol), esters (such as ethyl acetate), hydrocarbons (both of aliphatic and aromatic hydrocarbons are acceptable, such as toluene, hexane and heptane), ethers (such as diethyl ether and tetrahydrofuran), nitriles (such as acetonitrile), and ketones (such as acetone and 2-butanone). Alcoholic solvate is preferable, which more preferably contains methanol, ethanol, 2-propanol or 1-butanol. These solvents may be any of reaction solvents used for synthesizing the compound represented by the formula (1), may be solvents used for crystallization and purification after the synthesis, or may be mixtures of them.

Two or more species of solvents may concurrently be contained, or water and solvent may be contained together (for example, water and alcohol (such as methanol, ethanol, and t-butanol)).

The salt includes acid addition salt composed of an inorganic or organic acid. The inorganic acid is exemplified by hydrohalogenic acids (hydrochloric acid, hydrobromic acid), sulfuric acid and phosphoric acid. The organic acid is exemplified by acetic acid, trifluoroacetic acid, oxalic acid and citric acid, and further by alkanesulfonic acids (methanesulfonic acid), and arylsulfonic acids (benzenesulfonic acid, 4-toluenesulfonic acid, 1,5-naphthalenedisulfonic acid).

The salt is exemplified by those formed when the acidic moiety in the parent compound is substituted by a metal ion (such as alkali metal salt including sodium and potassium salts, alkali earth metal salt including calcium and magnesium salts, ammonium salt, alkali metal ion, alkali earth metal ion, and aluminum ion), or when prepared using an organic base (ethanolamine, diethanolamine, triethanolamine, morpholine, piperidine), but not limited thereto. Among them, sodium salt and potassium salt are preferable.

In the present invention, the salt of the compound 1-5 represented by the formula (1) or the compound represented by the formula (1-2) typically exist in the form of tautomers given by the formula below. Note that the tautomers are assumed as identical in the present invention, without discriminating them, and are represented by either one structure in specific examples.

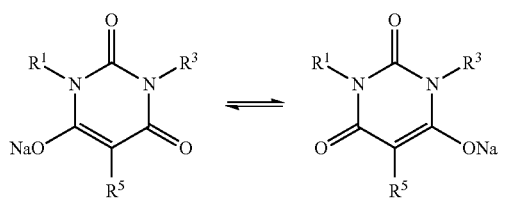

An existing form of molecule having therein at least one water-soluble group, and an existing form of hydrate or salt, are preferable when the salt is directed to be contained in the polarizer layer, which is composed of a hydrophilic polymer, from the viewpoint of compatibility. Meanwhile, also a hydrophobic existing form can exhibit an effect of improving the durability of the polarizer, similarly to the case where the compound of the present invention is added to the polarizer layer, typically by directly coating it onto the polarizer layer.

In the present invention, the compound represented by the formula (1) preferably has a molecular weight of 125 to 2,000, more preferably 200 to 1,500, and furthermore preferably 250 to 1,000, and particularly 350 to 800.

In the present invention, hydrophilicity of the compound represented by the formula (1) is represented by LogP value. P in LogP represents a partition coefficient in an n-octanol/water system, and is measurable using n-octanol and water. The partition coefficient may alternatively be determined as an estimated ClogP value, using ClogP value estimation program (CLOGP program installed on PC Models from Daylight Chemical Information Systems, Inc.). The ClogP is preferably −8.0 to 12.0, more preferably −5.0 to 10.0, and furthermore preferably −5.0 to 8.0.

Specific examples of the compound, etc. represented by the formula (1) will be shown below, without limiting the present invention. In the compounds shown below, Me represents a methyl group.

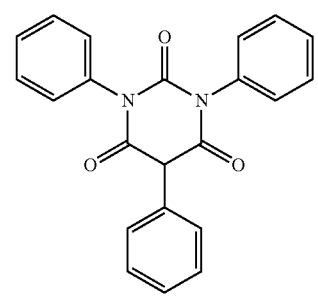

A-1

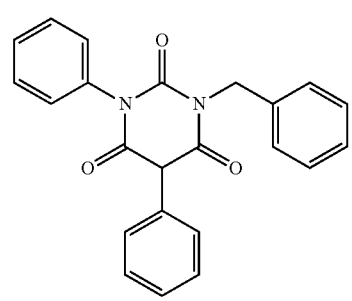

A-2

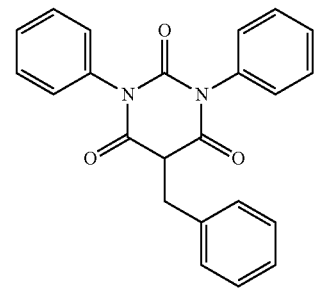

A-3

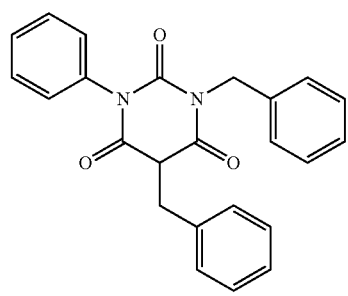
A-4
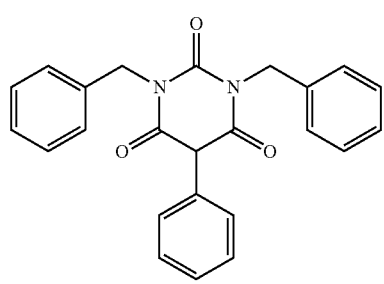
A-5
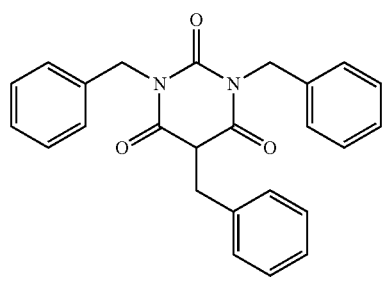
A-6
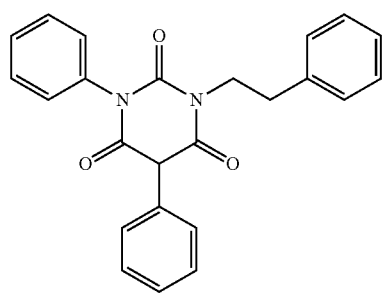
A-7
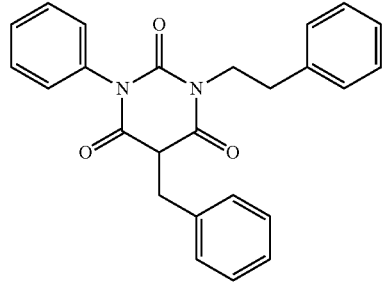
A-8
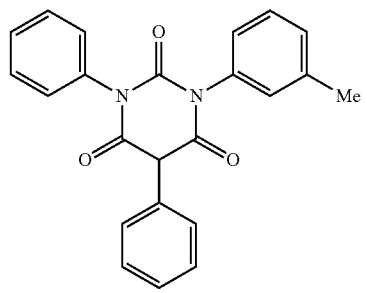
A-9
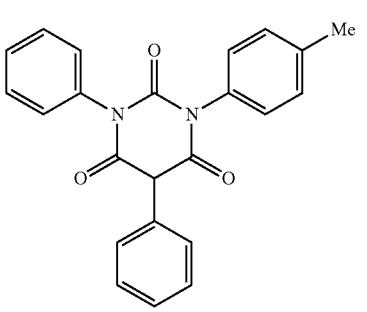
A-10
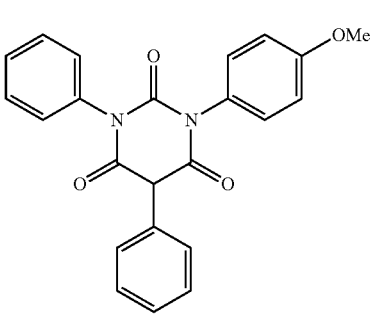
A-11
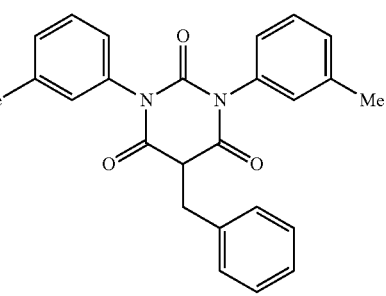
A-12
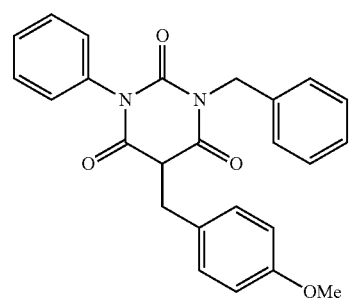
A-13

-continued
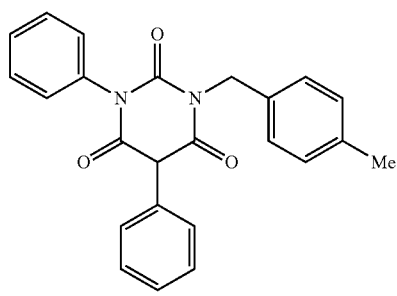
A-14
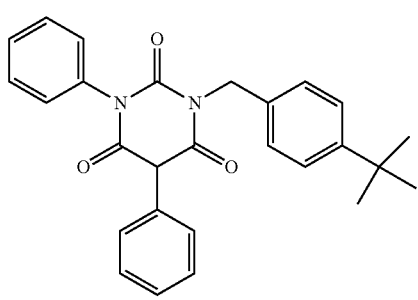
A-15
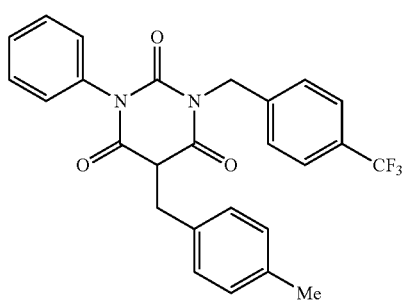
A-16
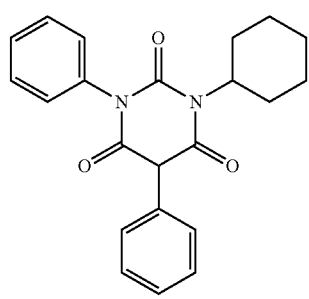
A-17
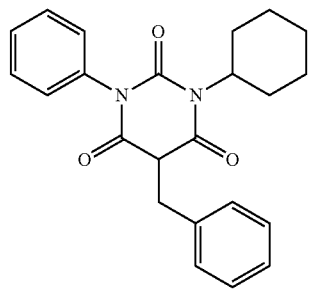
A-18
-continued
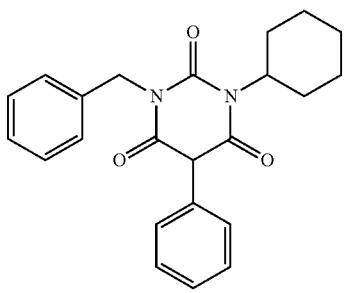
A-19
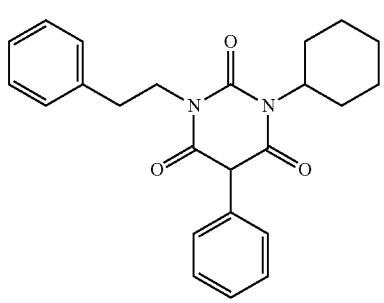
A-20
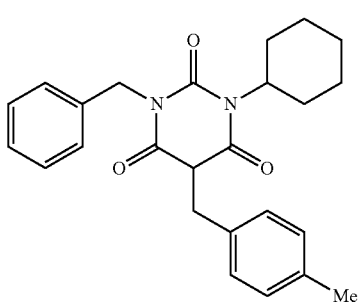
A-21
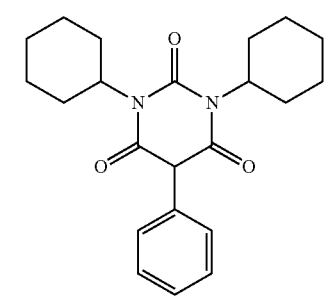
A-22
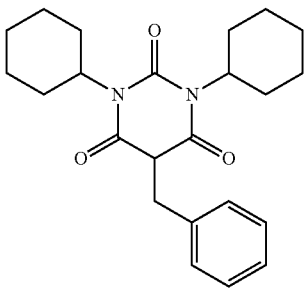
A-23

-continued
A-24
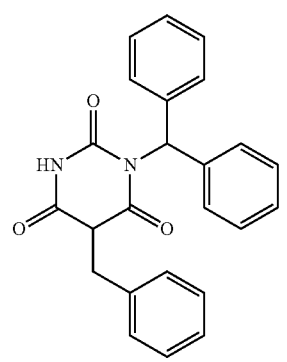
A-25
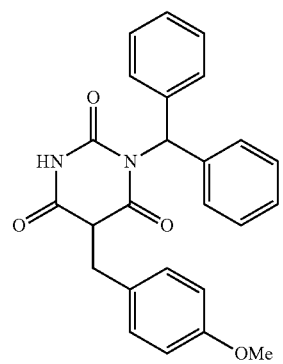
A-26
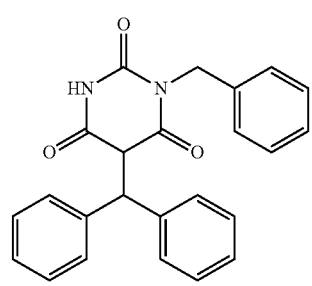
A-27
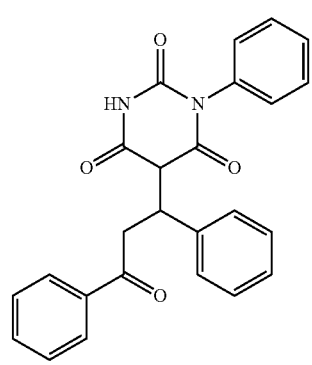
A-28
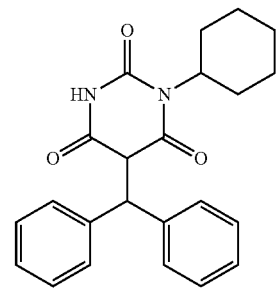
-continued
A-29
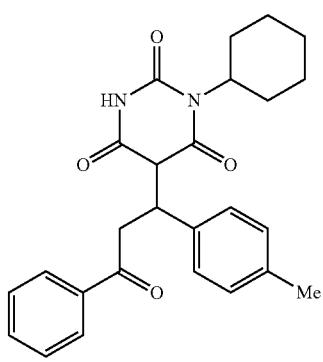
A-30
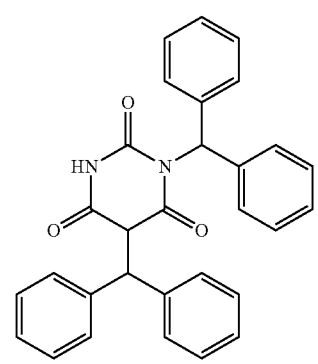
A-31
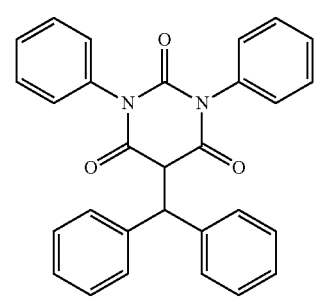
A-32
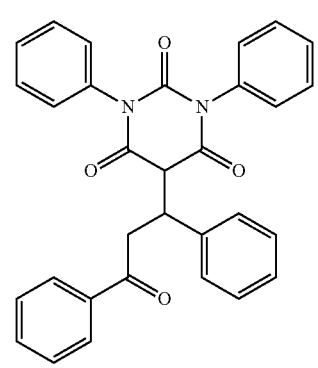
(A-33)
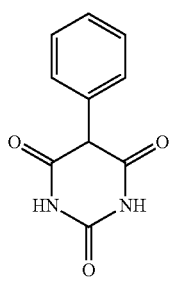

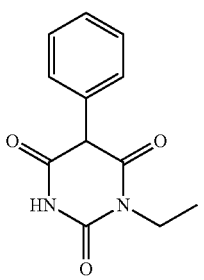 (A-34)
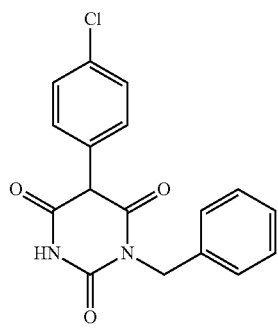 (A-39)
(A-35)
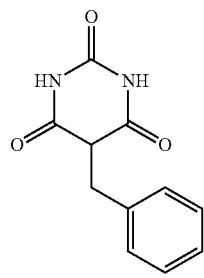 (A-40)
(A-36)
(A-41)
(A-37)
(A-42)
(A-38)
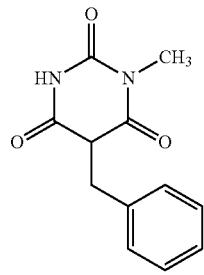
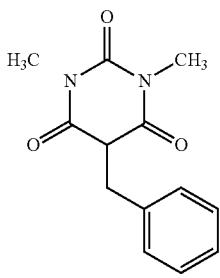
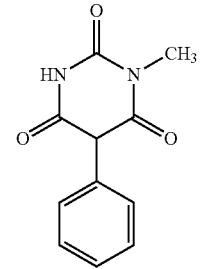 (A-43)

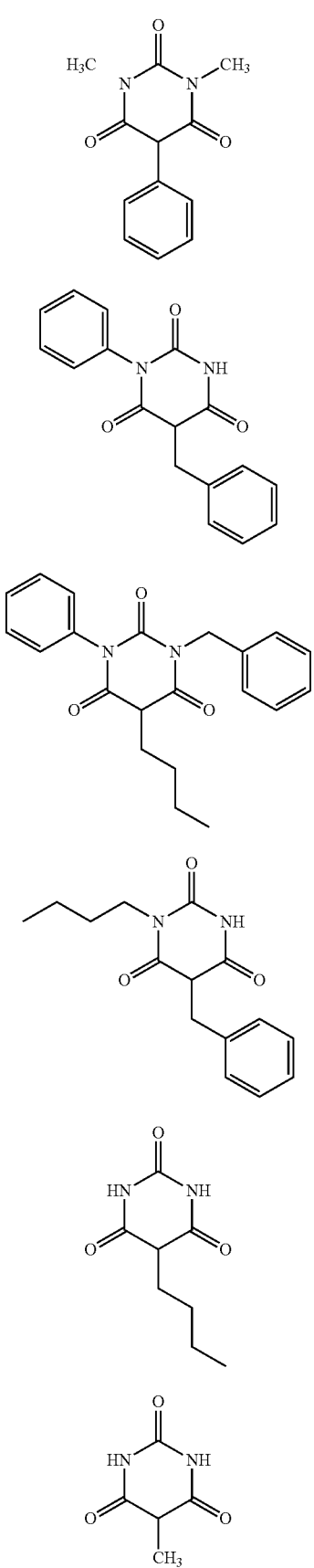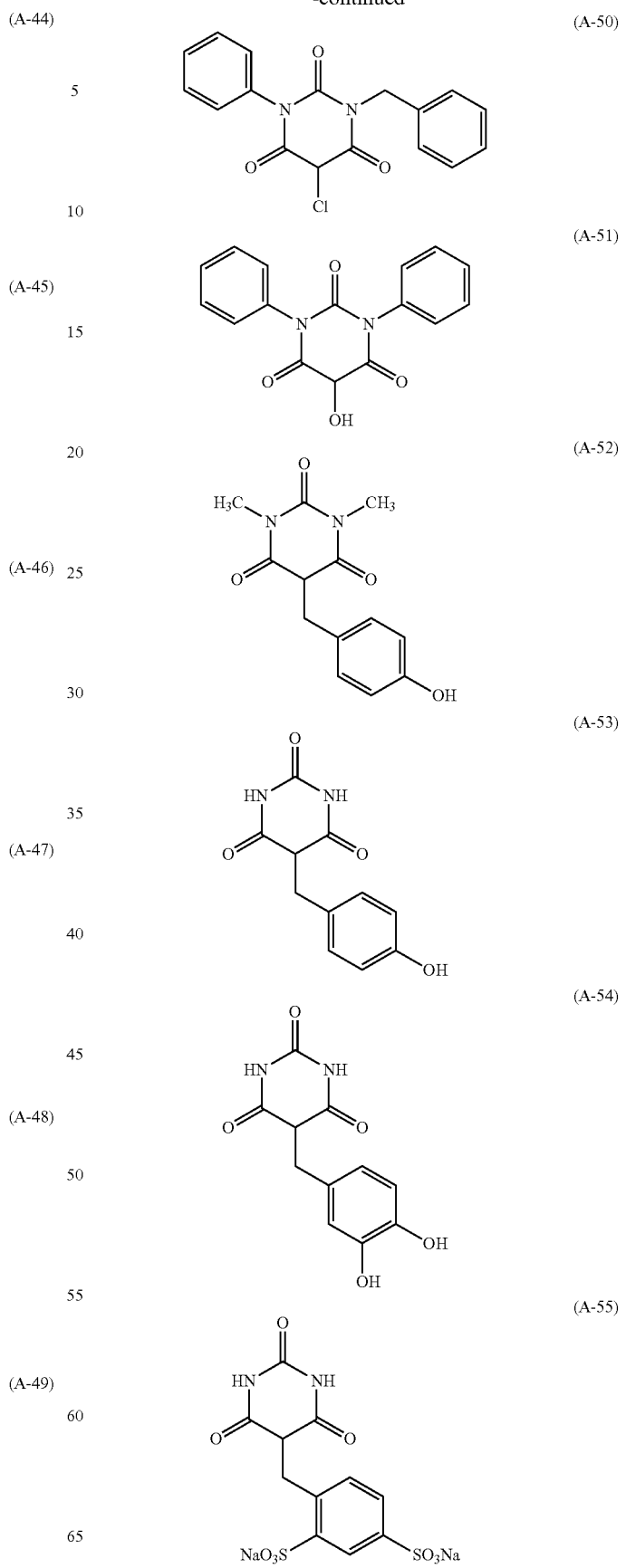

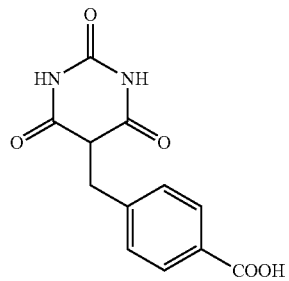
(A-56)
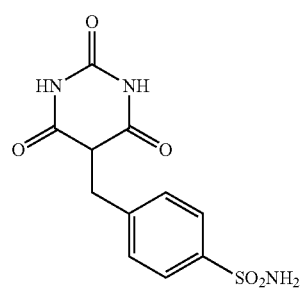
(A-57)
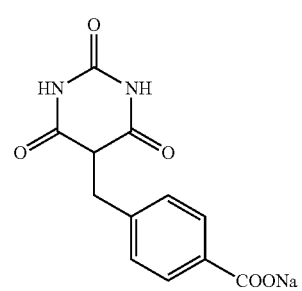
(A-58)
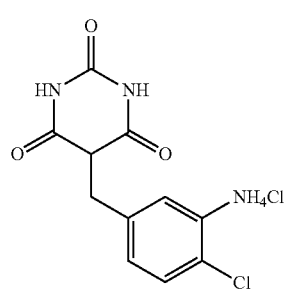
(A-59)
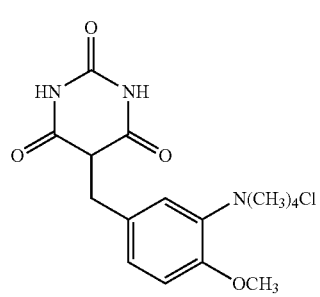
(A-60)
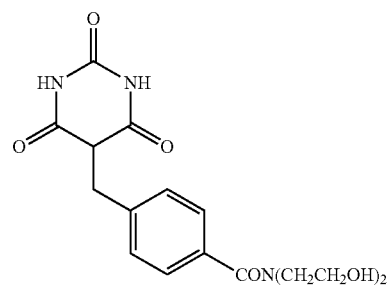
(A-61)
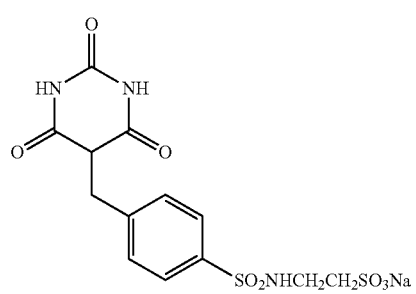
(A-62)
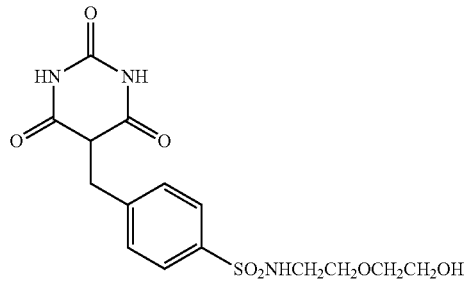
(A-63)
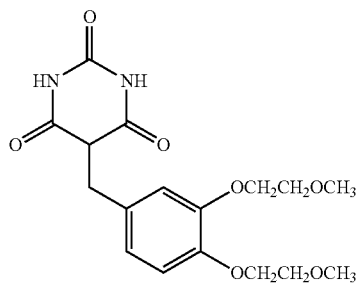
(A-64)
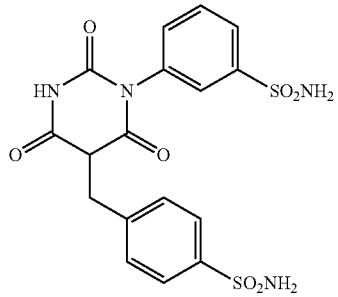
(A-65)

(A-66)
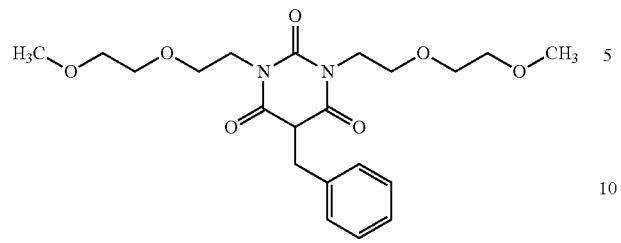
(A-67)
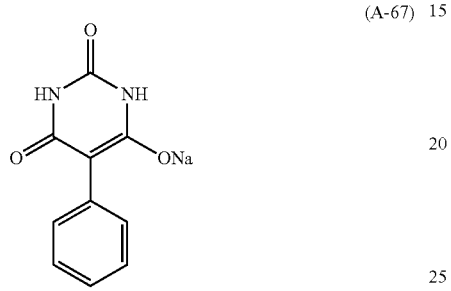
(A-68)
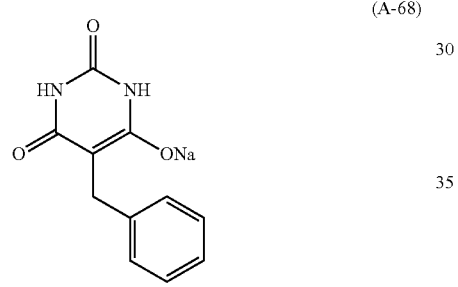
(A-69)
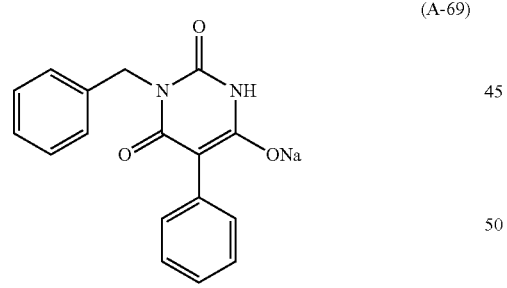
(A-70)
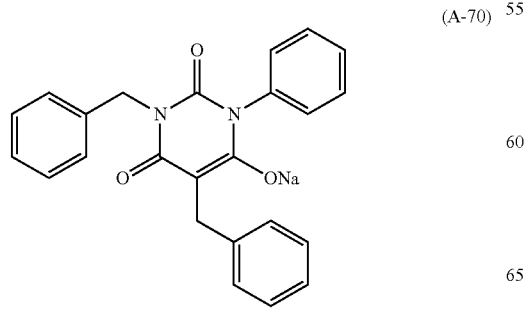
(A-71)
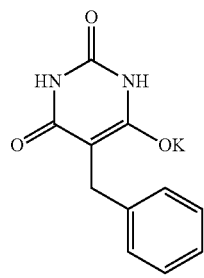
(A-72)
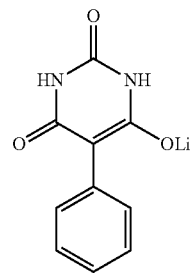
(A-73)
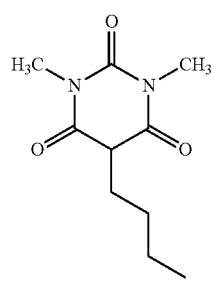
(A-74)
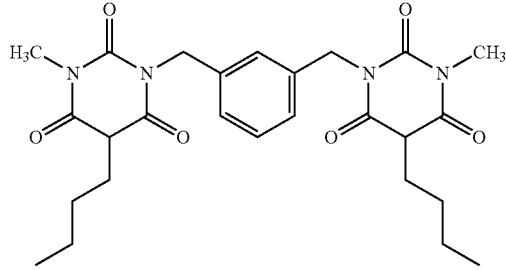
(A-75)
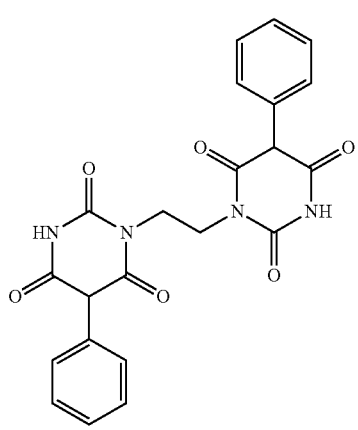

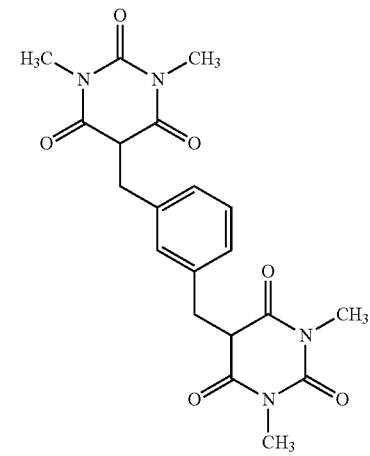 (A-76)

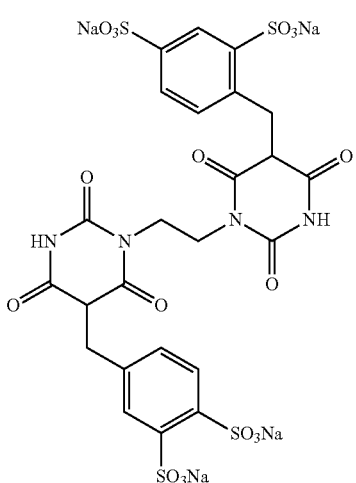 (A-79)

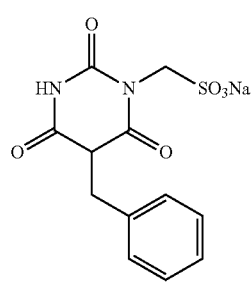 (A-80)

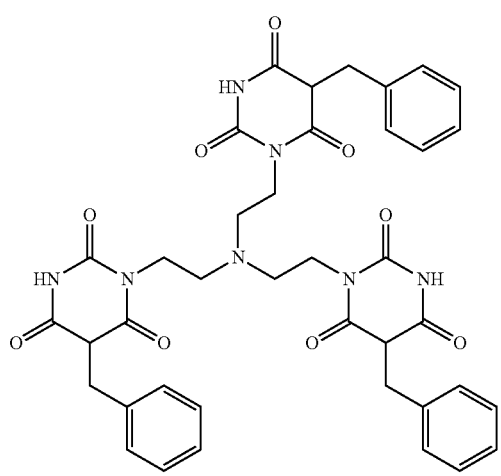 (A-77)

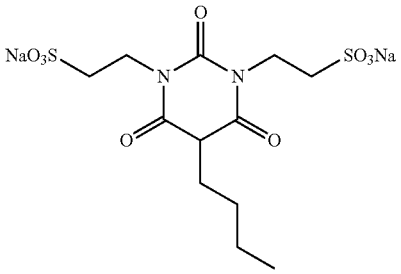 (A-81)

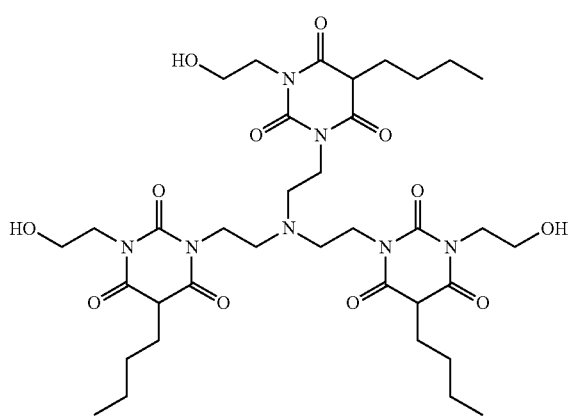 (A-78)

The compound represented by the formula (1) and the compound represented by the formula (1-2) are known to be synthesized by a method of synthesizing barbituric acid, based on condensation of an urea derivative with a malonic acid derivative. Barbituric acid having two substituents on the N atoms may be obtained by heating a N,N'-disubstituted urea with malonyl chloride, or by heating with a combination of malonic acid and an activator such as acetic anhydride. For example, methods described in *Journal of the American Chemical Society*, vol. 61, p. 1015 (1939), *Journal of Medicinal Chemistry*, vol. 54, p. 2409 (2011), *Tetrahedron Letters*, vol. 40, p. 8029 (1999), and WO2007/150011 are preferably used.

Both unsubstituted and substituted malonic acids are acceptable for use in the condensation. By using malonic acid having any of correspondent substituents for $R^5$ so as to configure barbituric acid, the compounds represented by the formula (1) may be synthesized. The compound represented by the formula (1) and the compound represented by the formula (1-2) may be synthesized alternatively by modifying barbituric acid unsubstituted at the 5-position, which is obtainable by condensing unsubstituted malonic acid with an urea derivative.

The 5-position may be modified by a nucleophilic substitution reaction with a halogenated alkyl compound, or by an addition reaction such as the Michael addition reaction. Also a method using dehydrating condensation with an aldehyde or ketone to produce an alkylidene or arylidene compound, and then reducing the double bond is preferably used. The methods preferably used herein are described, for example, in *Organic Letters,* 5, p. 2887 (2003), *Journal of Medicinal Chemistry,* 17, p. 1194 (1974), *Journal of Organic Chemistry,* 68, p. 4684 (2003), *Tetrahedron Letters,* 42, p. 4103 (2001), *Journal of the American Chemical Society,* 119, p. 12849 (1997), and *Tetrahedron Letters,* 28, p. 4173 (1987).

Methods of synthesizing the compound represented by the formula (1) and the compound represented by the formula (1-2) usable in the present invention are not limited to those described above.

The total content of the compound represented by the formula (1) or the formula (1-2), the hydrate of the compounds, the solvate of the compounds, and the salt of the compounds is 0.01 to 30 parts by mass relative to the polyvinyl alcohol-based resin, more preferably 0.01 to 10 parts by mass, and furthermore preferably 1 to 10 parts by mass. By adjusting the content to 0.01% by mass or more, it will be more easy to obtain an effect of improving the durability of polarizer, and by adjusting the content 30% by mass or less, the compound may fully be compatible with the polyvinyl alcohol-based resin, which is advantageous to retain the translucency.

<<Polyvinyl Alcohol-Based Resin>>

The polarizer of the present invention makes use of a polyvinyl alcohol-based resin (also referred to as PVA, hereinafter). The polarizer of the present invention is mainly composed of a polyvinyl alcohol resin which generally accounts for 80% by mass or more of the polarizer. While polyvinyl alcohol is generally a saponification product of polyvinyl acetate, it may contain some component polymerizable with vinyl acetate, such as unsaturated carboxylic acid, unsaturated sulfonic acid, olefins and vinyl ethers. Also modified polyvinyl alcohol-based resin containing acetoacetyl group, sulfonic acid group, carboxy group, or oxyalkylene group is usable.

While not specifically limited, the degree of saponification of the polyvinyl alcohol-based resin is preferably 80 to 100 mol % from the viewpoint of solubility and so forth, and particularly 90 to 100 mol %. Again while not specifically limited, the degree of polymerization of the polyvinyl alcohol-based resin is preferably 1,000 to 10,000, and particularly 1,500 to 5,000.

If the elastic modulus of the polyvinyl alcohol-based resin film before stretched is too small, the shrinkage factor during stretching and after stretching will become small, and thereby the film will have shrink persisted thereon. In contrast, if the elastic modulus is too large, the film will be applied with large tension during stretching, and need be strengthened at both edges where the film is held, and this increases load exerted on the machine. The elastic modulus of the film, in terms of Young's modulus, is preferably 0.1 MPa or larger and 500 MPa or smaller, and more preferably 1 MPa or larger and 100 MPa or smaller.

While not specifically limited, the thickness of the polyvinyl alcohol-based resin film before stretched is preferably 1 μm to 1 mm from the viewpoint of stability of holding of the film, and uniformity in the stretching, and particularly 20 to 200 μm. Meanwhile, the thickness of the polyvinyl alcohol-based resin film after stretched is preferably 2 to 100 μm, and in view of improving leakage of light, more preferably 10 to 25 μm. By the thickness, the thickness of the polarizer film is determined.

<<Dichroic Colorant>>

The polarizer of the present invention contains a dichroic colorant. The dichroic colorant in this specification means a dye showing different absorbance depending on direction, and includes iodine ion, diazo dyes, quinone dyes, and other publicly known dichroic colorants. The dichroic colorants preferably used is exemplified by higher-valency iodine ions such as $I_3^-$ and $I_5^-$, and dichroic dye.

In particular, the higher-valency iodine ions are preferably used in the present invention. The higher-valency iodine ions may be produced, as described in "Henkoban no Oyo (Applications of Polarizing Plate)", edited by Ryo NAGATA, published by CMC Publishing Co., Ltd., and in *Kogyo Zairyo (Engineering Materials)*, Vol. 28, No. 7, p. 39-45, by immersing a polyvinyl alcohol film into a solution obtained by dissolving iodine into an aqueous potassium iodide solution and/or aqueous boric acid solution, in a state adsorbed and oriented on the polyvinyl alcohol film.

The content of the dichroic colorant relative to the polyvinyl alcohol-based resin is preferably 0.1 to 50 parts by mass, more preferably 0.5 to 20 parts by mass, and furthermore preferably 1.0 to 5.0 parts by mass.

The polarizer of the present invention may optionally be added with plasticizer and so forth, besides the polyvinyl alcohol-based resin, the dichroic colorant, and the compound represented by the formula (1).

<Method of Manufacturing Polarizer>

The method of manufacturing the polarizer of the present invention includes making a polyvinyl alcohol-based resin into a film; stretching the polyvinyl alcohol-based resin film; and dyeing the stretched polyvinyl alcohol-based resin film with a dichroic colorant, further including:

applying 0.01 to 30 parts by mass of the compound represented by the formula (1), the compound represented by the formula (1-2), the hydrate of the compounds, the solvate of the compounds, and the salt of the compounds, per 100 parts by mass of the polyvinyl alcohol-based resin;

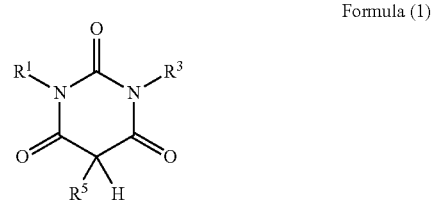

Formula (1)

in the formula (1), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group or $C_{6-20}$ aromatic group, and $R^5$ represents a substituent;

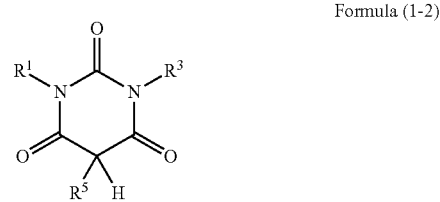

Formula (1-2)

in the formula (1-2), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group, or $C_{6-20}$ aromatic group, and $R^5$ represents a substituent; where at least one of $R^1$, $R^3$ and $R^5$ is a water-soluble group, or contains a water-soluble group, or both of $R^1$ and $R^3$ represent a hydrogen atom.

In the method of manufacturing the polarizer of the present invention, the polarizer is preferably configured typically by making the polyvinyl alcohol-based resin into a film, and then introducing iodine therein. The polyvinyl alcohol-based resin film may be formed referring for example to the methods described in paragraphs [0213] to [0237] of JP-A-2007-86748, JP-B-3342516, JP-A-H09-328593, JP-A-2001-302817 and JP-A-2002-144401. When the compound represented by the formula (1) should be added to the polyvinyl alcohol-based resin is not specifically limited.

Methods of applying the compound, etc. represented by the formula (1) to the polyvinyl alcohol-based resin are any of those publicly known. More specifically, the polarizer containing the compound, etc. represented by the formula (1) may be manufactured by various methods, which include a style of directly adding the compound represented by the formula (1) into the polarizer layer, a style of coating it onto the surface of the polarizer layer, and a style of ensuring compatibility with the polyvinyl alcohol-based resin by using the compound represented by the formula (1-2), so that the methods of incorporating the compound, etc. represented by the formula (1) into the polarizer are not specifically limited. While not specifically limited, when coating onto the surface of the polarizer layer, the possibly highest concentration of the compound is preferably dissolved in a solvent used for preparing the coating liquid.

By making the polarizer layer containing the compound of the present invention by such various techniques, the polarizer is successfully improved in the durability.

In the process of making the polyvinyl alcohol-based resin solution into a film, the polyvinyl alcohol-based resin is preferably added into water under stirring, to thereby prepare a stock solution having the polyvinyl alcohol-based resin dissolved in water or organic solvent. The concentration of the polyvinyl alcohol-based resin in the stock solution is preferably 5 to 20% by mass. It is alternatively preferable to dewater the obtained slurry, to thereby once prepare a wet cake of the polyvinyl alcohol-based resin with a water content of 40% or around. If some additive is further added thereto, a preferable method is such as placing the wet cake of polyvinyl alcohol into a dissolving tank, adding thereto a plasticizer and water, and stirring the mixture by blowing water vapor from the bottom of the tank. The heating temperature is preferably 50 to 150° C. in terms of internal resin temperature. The system may be pressurized.

When the compound represented by the formula (1) is added to the polarizer in this process, the compound represented by the formula (1) is preferably in the form of salt or hydrate, from the viewpoint of uniform dispersibility in the polarizer. The compound represented by the formula (1) and the compound represented by the formula (1-2) are preferably added in such a way that a wet cake of polyvinyl alcohol is placed into a dissolving tank, and agitating it while blowing steam from the bottom.

In the present invention, a method of casting the above-prepared stock solution of the polyvinyl alcohol-based resin solution is preferably used in general. While the method of casting is not specifically limited, it is preferable to feed the heated stock solution of the polyvinyl alcohol-based resin to a twin-screw extruder, and to cast the solution with the aid of a gear pump through an extrusion unit (preferably a die, and more preferably a T-slot die) onto a support for film-making. The temperature of the resin solution extruded from the die is not specifically limited.

The support is preferably a cast drum, with no special limitations on the diameter, width, rotating speed, and surface temperature thereof. Among them, the diameter (R1) of the cast drum is preferably 2000 to 5000 mm, more preferably 2500 to 4500 mm, and particularly 3000 to 3500 mm.

The width of the cast drum is preferably 2 to 6 m, more preferably 3 to 5 m, and particularly 4 to 5 m.

The rotating speed of the cast drum is preferably 2 to 20 m/min, more preferably 4 to 12 m/min, and particularly to 10 m/min.

The surface temperature of the cast drum is preferably 40 to 140° C., more preferably 60 to 120° C., and particularly 80 to 100° C.

The temperature of resin at the output port of the T-slot die is preferably 40 to 140° C., more preferably 60 to 120° C., and particularly 80 to 100° C.

Thereafter, the thus-obtained rolled film is preferably dried while allowing the top surface and the back surface thereof to alternately pass over drying rolls. There are no special limitations on the diameter, width, rotating speed, and surface temperature of the drying rolls. Among them, the diameter (R1) of the cast drum is preferably 200 to 450 mm, more preferably 250 to 400 mm, and particularly 300 to 350 mm.

There are also no special limitations on the length of the thus-obtained film, where the film may be a web of 2000 m or longer, and preferably 4000 m or longer. Also the width of the film is not specifically limited, and may preferably be 2 to 6 m, and more preferably 3 to 5 m.

The polyvinyl alcohol-based resin solution is made into a film, and then stretched. The stretching may be conducted according to a longitudinal uniaxial stretching system as described in U.S. Pat. No. 2,454,515, or a tenter system as described in JP-A-2002-86554. The factor of stretching is preferably 2 to 12, and more preferably 3 to 10. A relation among the factor of stretching, the thickness of web, and the thickness of polarizer is preferably such as (thickness of polarizer after bonded with protective film/thickness of web)×(total factor of stretching)>0.17 as described in JP-A-2002-040256, or a relation between the width of polarizer as taken out from the final bath, and the width of polarizer as bonded with the protective film is preferably such as 0.80≤ (width of polarizer as bonded with protective film/width of polarizer as taken out from final bath)≤0.95 as described in JP-A-2002-040247.

After the stretching, the polyvinyl alcohol-based resin film is dyed with a dichroic colorant. The dyeing is conducted by adsorption in vapor phase or liquid phase. For an exemplary liquid phase adsorption using iodine as the dichroic colorant, the polymer film for making the polarizer is immersed in an aqueous iodine-potassium iodide solution. The iodine content is preferably 0.1 to 20 g/l, the potassium iodide content is preferably 1 to 200 g/l, and ratio by mass of iodine and potassium iodide is preferably 1 to 200. The time of dyeing is preferably 10 to 5000 seconds, and the temperature of bath is preferably 5 to 60° C. The method of dyeing is not limited to dipping, and is arbitrarily selectable for example from coating and spraying of iodine solution or dye solution. While the process of dyeing may either precede or succeed the process of stretching in the present invention, the dyeing preferably precedes the process of stretching in liquid phase, since the film will appropriately swell and become easier to be stretched.

The dyeing may be conducted according to a method described in JP-A-2002-86554. The method of dyeing is not limited to dipping, and selectable from arbitrary means which include coating and spraying of iodine solution or dye solution. Alternatively usable is a method of dyeing while setting the iodine concentration, temperature of dyeing bath, and factor of stretching in the bath as described in JP-A-2002-290025, and while stirring the solution in the bath.

Still alternatively, the dyeing bath may be added with a boron-containing compound such as boric acid, borax or the like as described in JP-B-3145747.

Other processes may include swelling process, curing process and drying process. These processes are described in paragraphs [0039] to [0050] of JP-A-2011-237580, the contents of which are incorporated into this specification.

The compound represented by the formula (1) or the compound, etc. represented by the formula (1-2) may be contained in at least any one of baths used in the aforementioned processes. For example, one possible style is as dying the polyvinyl alcohol-based resin using a dying bath added with 0.00001 to 10% by mass, relative to the processing bath, of the compound represented by the formula (I) or the compound represented by the formula (1-2).

<Polarizing Plate>

The polarizer of the present invention may be used as the polarizing plate, in the form having bonded at least on one surface thereof, the protective film (translucent protective film), the substrate of the liquid crystal cell, and so forth. The polarizing plate of the present invention, having the polarizer of the present invention, is improved in the durability under high-temperature and high-humidity conditions.

The polarizing plate protective film preferably satisfies the characteristics below.

Now, for the case where the polarizing plate of the present invention has two sheets of polarizing plate protective film, these two sheets may be the same or different.

From the viewpoint of ensuring a sufficient intensity of transmitted light through the polarizing plate of the present invention, the transmittance of the polarizing plate protective film is preferably 85% or above, more preferably 88% or above, and particularly 90% or above.

The polarizing plate protective film preferably has a haze of 2% or below, more preferably 1.5% or below, and particularly 1.0% or below.

The thickness of the polarizing plate protective film is generally 5 μm or larger in view of ensuring the protective function, handleability and workability, preferably 10 μm or larger, more preferably 15 μm or larger. The thickness is also preferably 300 μm or smaller, more preferably 200 μm or smaller, and furthermore preferably 100 μm or smaller.

Source material for composing the polarizing plate protective film is exemplified by cellulose ester-based resin, polycarbonate-based resin, polyester carbonate-based resin, polyarylate-based resin, polysulfone-based resin, polyethersulfone-based resin, cycloolefin-based resin such as norbornene-based resin, polystyrene-based resin, polyacrylate-based resin, polymethacrylate-based resin, polyester-based resin, and imide-based resin such as olefin-maleimide-based resin and glutarimide-based resin, which may be used independently, or in a mixed form. Films preferably used are those composed of, among these resins, cellulose ester-based resin, cycloolefin-based resin, polystyrene-based resin, imide-based resin, and polymethacrylate-based resin, which have relatively small birefringence ascribable to molecular orientation, and small photo-elastic coefficient.

Examples of the polarizing plate protective film preferably used include commercially available cellulose triacetate film (FujitacTD80UF, from FUJIFILM Corporation), alicyclic structure-containing polymer resin film described in JP-A-2006-58322, and acrylic resin described in JP-A-2009-122644.

Preferable resins and additives used for the polarizing plate protective film, and the methods of manufacturing may be referred, for example, to JP-A-2005-104149, and paragraphs [0034] to [0040] of JP-A-2012-014148.

The polarizing plate of the present invention is alternatively usable in the form of laminate of functional layers such as retardation layer, anti-reflection layer, hard coat layer, forward scattering layer, or antiglare layer stacked on the polarizing plate protective film; or in the form of functionalized polarizing plate combined with optical films such as a film having the functional layers described above, optical compensation film, and luminance enhancing film, for the purpose of improving visibility and mechanical characteristics of the display. The anti-reflection film, luminance enhancing film, other functional optical films, hard coat layer, forward scattering layer, and antiglare layer are described in paragraphs [0257] to [0276] of JP-A-2007-86748. Based on the description, the functionalized polarizing plate may be manufactured.

The polarizing plate of the present invention is also usable as a functional optical film further provided with functional layers such as hard coat layer, forward scattering layer, antiglare layer, gas barrier layer, slipping layer, antistatic layer, under coat layer and protective layer. These functional layers are also usable by combining with each other in the same layer with the anti-reflection layer or with an optically anisotropic layer in the aforementioned anti-reflection film. These functional layers may be used as provided on either one side directed to the polarizer or on the opposite side (directed to the outer air), or on both sides.

Functions which may be combined with these polarizing plate protective films may be referred, for example, to JP-A-2005-104149, and paragraphs [0139] to [0160] of JP-A-2012-014148.

<Product Form of Polarizing Plate>

Product form of the polarizing plate of the present invention includes not only a polarizing plate in the form of film piece cut into a size suitable for assemblage into the liquid crystal display device, but also a roll obtained by taking up a long web manufactured by continuous production (for example, rolls with a length of web of 2500 m or longer, or 3900 m or longer). Considering applications to large-sized liquid crystal display device, the polarizing plate is preferably 1000 mm wide or wider.

<Performance of Polarizing Plate>

The polarizing plate of the present invention, given with the configuration described above, is successfully improved in the durability of the polarizer under high-temperature and high-humidity conditions, without degrading the durability of the polarizer under high-temperature and high-humidity conditions.

In this specification, the durability of the polarizer is evaluated by measuring changes in cross transmittance of the polarizing plate under a specific environment.

(Cross Transmittance CT)

The polarizing plate of the present invention preferably has a cross transmittance CT expressed by $CT \leq 2.0$, more preferably $CT \leq 1.3$, and particularly $CT \leq 0.6$ (all in %).

(Changes in Cross Transmittance)

For the polarizing plate of the present invention, the smaller the changes in the polarizing plate durability test, the better.

The polarizing plate of the present invention, which is allowed to stand at 60° C. with a relative humidity of 95% for 500 hours, preferably shows the amount of change (%) in the cross single plate transmittance of 0.60% or smaller, and, after allowed to stand at 80° C. in a dry environment (without moisture control, at a relative humidity of 0% to 20% in Examples of the present invention) for 500 hours, preferably shows the amount of change (%) in the cross single plate transmittance of 0.10% or smaller.

The amount of change (%) in the cross single plate transmittance after allowed to stand at 60° C. with a relative humidity of 95% for 500 hours is preferably 0.30% or smaller, and more preferably 0.25% or smaller. Meanwhile, the amount of change (%) in the cross single plate transmittance after allowed to stand at 80° C. in a dry environment for 500 hours is preferably 0.05% or smaller.

The amount of change herein means remainder of subtraction of a measured value before the test from a measured value after the test.

If the amount of change in the cross transmittance falls in the above-described ranges, the polarizing plate is preferably ensured to have a good level of stability during long-term use or storage under high-temperature and high-humidity conditions, and under high-temperature and low-humidity conditions.

The cross transmittance CT of the polarizing plate was measured using VAP-7070 (from JASCO Corporation). Measurement was conducted at 410 nm and 550 nm, and average values from the measurement repeated 10 times were used.

The polarizing plate durability test is conducted as described below, using a polarizing plate bonded to a glass plate while placing a pressure sensitive adhesive in between. Two samples, each having a polarizing plate bonded to a glass plate (ca. 5 cm×5 cm) so as to direct the cellulose acylate film of the present invention to the interface with the air, are manufactured. The cross transmittance is measured by setting each sample while directing the cellulose acylate film of the present invention to the light source. Two samples were independently measured, and an average value was determined as the cross transmittance of the polarizer in Example.

The cross transmittance of the polarizing plate was measured using an automatic polarizing film analyzer VAP-7070 from JASCO Corporation, in the range from 380 nm to 780 nm, and measurement values at 410 nm and 550 nm were used.

Each polarizing plate was allowed to stand under an environment at 60° C., 95% relative humidity, for 1,000 hours, and then measured with respect to the cross transmittance in the same way.

Difference in the cross transmittance before and after the elapse of time was determined, and was used for evaluating the durability of the polarizing plate. The relative humidity in an environment without intentional humidity control was found to fall in the range from 0 to 20% RH.

(Other Characteristics)

Other preferable optical characteristics of the polarizing plate of the present invention are described in paragraphs [0238] to [0255] of JP-A-2007-086748, which are preferably satisfied.

<Method of Manufacturing Polarizing Plate>

The polarizing plate of the present invention is used in the form of laminate of the polarizer and the individual constitutive members bonded with the aid of an adhesive layer or the like. The surface on which the adhesive layer is formed may be either one of the surfaces to be bonded of the polarizer and the individual constitutive members such as the polarizing plate protective film, or may be both of them.

When the polarizing plate protective film is bonded to the polarizer of the present invention, it is preferable to bond them so as to align the transmission axis of the polarizer substantially in parallel with the slow axis of the polarizing plate protective film.

Now "substantially in parallel with" means that shift between the direction of principal refractive index nx of the polarizing plate protective film containing the compound and the direction of the transmission axis of the polarizing plate falls within 5°, preferably within 1°, and more preferably within 0.5°. If the shift falls within 1°, the polarizing plate is less likely to degrade in the polarization performance under the crossed Nicol, and is advantageous in terms of less opportunity of leakage of light.

The method of bonding the polarizing plate of the present invention and the individual constitutive members varies depending on properties of the adhesive layer. If the adhesive layer shows tackiness, it may be used for bonding without modification. In this case, the method may include a process of improving the adherence, such as saponification.

[Liquid Crystal Display Device]

Next, the liquid crystal display device of the present invention will be explained.

FIG. 1 is a schematic drawing illustrating an exemplary liquid crystal display device of the present invention. As seen in FIG. 1, a liquid crystal display device 10 is configured by a liquid crystal cell, which has a liquid crystal layer 5, and an upper electrode substrate of liquid crystal cell 3 and a lower electrode substrate of liquid crystal cell 6 disposed on the upper and lower sides thereof; and an upper polarizing plate 1 and a lower polarizing plate 8 disposed on both sides of the liquid crystal cell. A color filter may be disposed between the liquid crystal cell and each of the polarizing plates. When the liquid crystal display device 10 is used in the form of transmission type, a back light which uses a cold cathode or hot cathode fluorescent lamp, a light emitting diode, field emission element, or electroluminescent element as a light source, is disposed on the back side.

Each of the upper polarizing plate 1 and the lower polarizing plate 8 is often used in a configuration in which a polarizer is held between two sheets of polarizing plate protective film. The liquid crystal display device of the present invention 10 may alternatively be configured by using an optical compensation film as the protective film on the liquid crystal cell side of the polarizing plate, or may still alternatively be configured by directly bonding the polarizer with the electrode substrates 3 and 6 using an adhesive layer, without placing the protective film in between.

The liquid crystal display device 10 includes those of direct view type, projection type, and optical modulation type. Operation mode of the liquid crystal layer 5 is arbitrarily selectable from known various modes which include TN mode, VA mode, fringe-field switching mode including IPS mode, OCB mode and ECB mode.

While not exemplified, the polarizing plate of the present invention is also usable as a part of circular polarizing plate which is disposed for antireflective purposes in other configurations, such as reflection-type and semi-transmissive liquid crystal display devices, and self-emitting elements such as organic EL element.

EXAMPLE

Paragraphs below will further specifically describe features of the present invention, referring to Examples and Comparative Examples. Any materials, amount of use, ratio, details of processing, procedures of processing and so forth shown in Examples may appropriately be modified without departing from the spirit of the present invention. Therefore, it is to be understood that the scope of the present invention should not be interpreted in a limited manner based on the specific examples shown below.

<Synthesis of Compound Represented by Formula (I)>

The compound represented by the formula (1) in the present invention was synthesized as described below.

Exemplary Synthesis 1: Synthesis of Exemplary Compound (A-4)

The Exemplary Compound (A-4) was synthesized according to the scheme below.

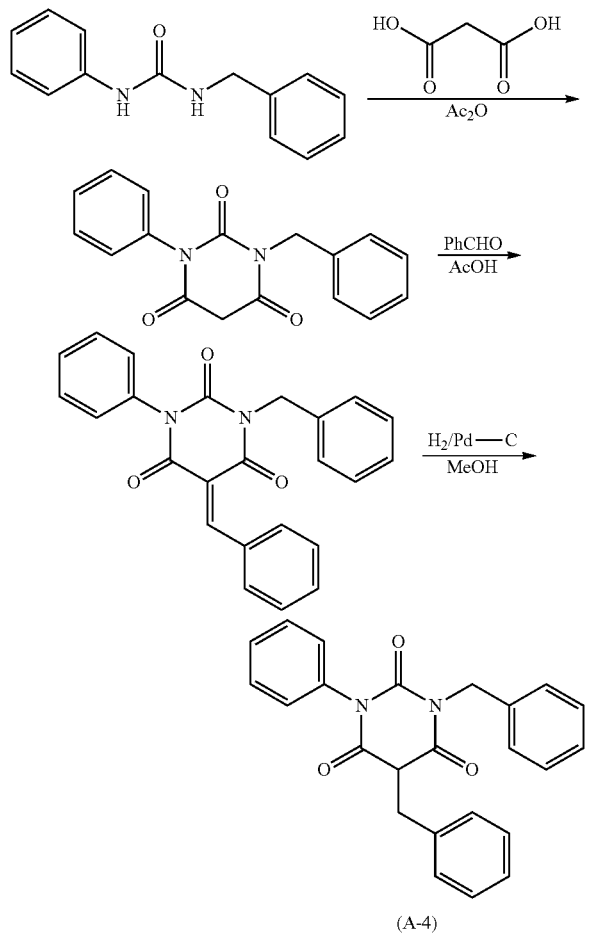

(A-4)

1) Synthesis of Intermediate
1-Benzyl-3-Phenylbarbituric Acid

In a 300-ml glass flask equipped with a thermometer, a reflux condenser and a stirrer, 5.0 g of N-benzyl-N'-phenylurea synthesized in Exemplary Synthesis 1, 2.5 g of malonic acid, 20 ml of toluene, and 5.6 g of acetic anhydride were put, the content was heated under stirring so as to adjust the inner temperature to 80° C., and kept under stirring at 80° C. for 3 hours. The content was then cooled to 50° C., washed with 15 ml of water, and the aqueous phase was discarded. The organic layer was kept under stirring at room temperature, and 5 ml of isopropanol was dropped therein. The content was further stirred at 10° C. or below for 0.5 hours, filtered under suction to collect a deposited crystal, the crystal was washed with cold isopropanol, and dried, to thereby obtain 4.6 g of 1-benzyl-3-phenylbarbituric acid as an intermediate.

2) Synthesis of Intermediate

1-Benzyl-5-Benzylidene-3-Phenylbarbituric Acid

In a 300-ml glass flask equipped with a thermometer, a reflux condenser and a stirrer, 4.0 g of 1-benzyl-3-phenylbarbituric acid, 1.6 g of benzaldehyde, and 40 ml of acetic acid were put, the content was added with a drop of sulfuric acid, kept under stirring, the flask was heated so as to adjust the inner temperature to 100° C., and the content was continued to be stirred at 100° C. for 3 hours. The content was then cooled to 50° C., added with a mixed solution of 39 ml of isopropanol and 17 ml of water, stirred at 10° C. or below for one hour, filtered under suction to collect a deposited crystal, and the crystal was washed with methanol, to thereby obtain 3.9 g of 1-benzyl-5-benzylidene-3-phenylbarbituric acid as an intermediate.

Structure of the thus obtained compound was confirmed by $^1$H-NMR spectrum.

$^1$H-NMR (300 MHz, CDCl$_3$), δ: 8.70 (s, 1H), 8.10 (d, 2H), 7.58-7.20 (m, 15H), 5.20 (s, 2H)

3) Synthesis of Exemplary Compound (A-4)

In a 50-ml autoclave, 3.5 g of 1-benzyl-5-benzylidene-3-phenylbarbituric acid, and 8 ml of methanol were put, the content was added with 0.1 g of Pd—C (10%), kept under stirring, the autoclave was filled with H$_2$, heated so as to adjust the inner temperature to 50° C., the content was continued to be stirred at 50° C. for 3 hours. Pd—C was then removed by filtration, the filtrate was cooled to 5° C., further added with 4 ml or water, stirred at 5° C. for one hours, filtered under suction to collect a deposited crystal, the crystal was washed with a mixed solution of methanol/water=1/1, and dried, to thereby obtain 3.0 g of Exemplary Compound (A-4).

Structure of the thus obtained compound was confirmed by $^1$H-NMR spectrum, IR spectrum and mass spectrum.

$^1$H-NMR (300 MHz, CDCl$_3$), δ: 7.52-7.16 (m, 10H), 5.10 (s, 2H), 3.86 (s, 2H)

Exemplary Synthesis 2: Synthesis of Exemplary Compound (A-55)

Exemplary Compound (A-55) was synthesized according to the scheme below.

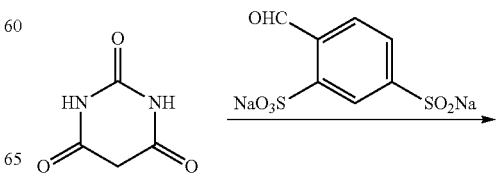

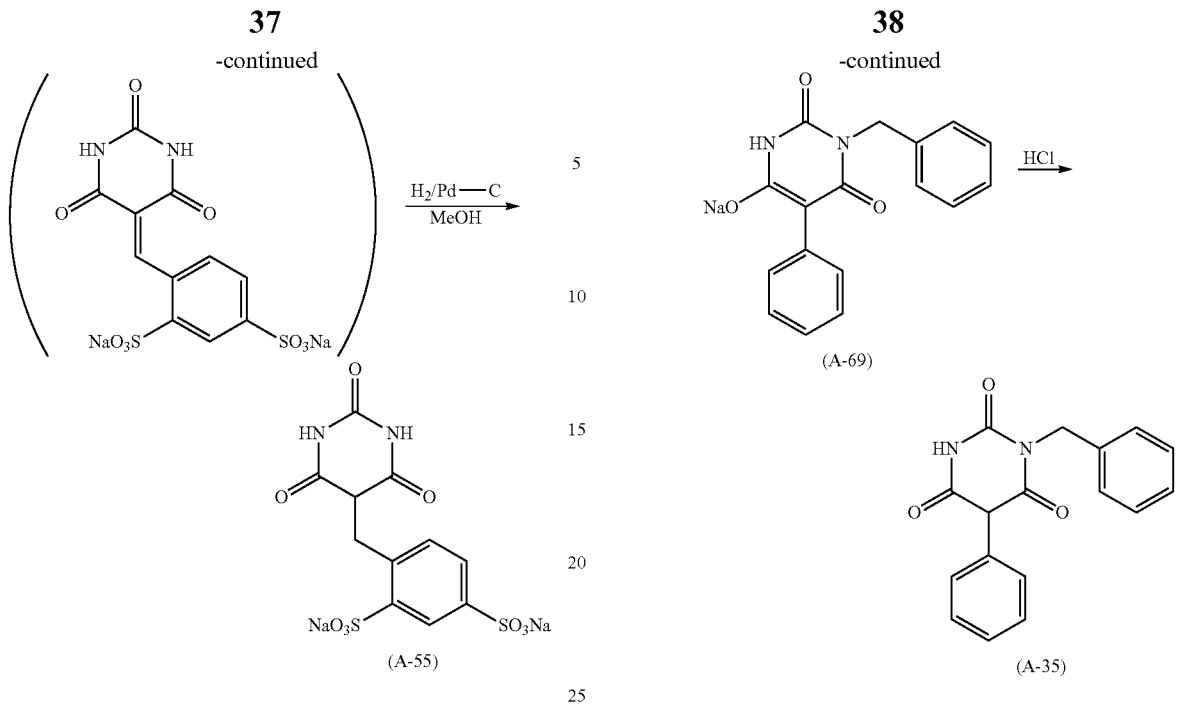

In a 500-ml autoclave, 5.0 g of barbituric acid, 12.1 g of disodium 4-formylbenzene-1,3-disulfonate, and 400 ml of methanol were put, the content was added with 0.1 g of Pd—C (10%), kept under stirring, the autoclave was filled with $H_2$ up to 3.0 MPa, heated so as to adjust the inner temperature to 50° C., and the content was continued to be stirred at 50° C. for 7 hours. Pd—C was then removed by filtration, and the solvent was distilled off. The residue was added with 200 ml of methanol at 40° C. so as to re-dissolve the crude product, the content was cooled to 0° C., the obtained crystal was collected by filtration under suction, and dried, to thereby obtain 15.4 g of Exemplary Compound (A-55).

Structure of the thus obtained compound was confirmed by $^1$H-NMR spectrum and mass spectrum.

$^1$H-NMR (300 MHz, CDCl$_3$), δ: 12.58 (s, 1H), 10.84 (s, 1H), 10.62 (s, 1H), 7.99 (d, 1H), 7.45 (d, 1H), 7.38 (d, 2H), 3.94 (s, 2H)

Exemplary Synthesis 3: Synthesis of Exemplary Compounds (A-35), (A-69)

Exemplary Compounds (A-35), (A-69) were synthesized according to the scheme below.

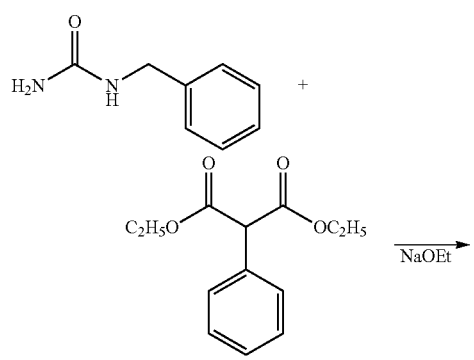

In a 300-ml three-necked flask equipped with a thermometer, a reflux condenser and a stirrer, 30.4 g (0.20 mol) of N-benzylurea, 56.7 g (0.24 mol) of ethyl phenylmalonate, and 102.1 g (0.30 mol) of a 20% sodium ethoxide/ethanol solution, the content was kept under stirring, and refluxed under heating for 4 hours. A part of ethanol was then distilled off, the content was cooled to room temperature, and added with 100 ml of ethyl acetate. Deposited crystal was collected by filtration under suction, washed with ethyl acetate, the crystal was collected, and dried under reduced pressure, to thereby obtain 43.0 g (68% yield) of Exemplary Compound (A-69) in the form of while solid.

A part (21.5 g) of Exemplary Compound (A-69) was dissolved in 100 ml of water, and hydrochloric acid was dropped therein so as to adjust the pH to 1, to thereby allow the crystal to deposit. The deposited solid was collected by filtration under suction, and washed with water. The crude product was then washed with isopropanol under heating, the mixture was cooled to room temperature, filtered, and the crystal was dried under reduced pressure, to thereby obtain 19.1 g of Exemplary Compound (A-35) in the form of white solid. Structure of the thus obtained compound was confirmed by $^1$H-NMR spectrum and mass spectrum.

Exemplary Synthesis 4: Synthesis of Exemplary Compounds (A-33), (A-67)

Exemplary Compounds (A-33), (A-67) were synthesized in the same way as Exemplary Synthesis 3, except that N-benzylurea was replaced with urea.

Exemplary Synthesis 5: Synthesis of Exemplary Compounds (A-40), (A-68)

Exemplary Compounds (A-40), (A-68) were synthesized in the same way as Exemplary Synthesis 3, except that N-benzylurea was replaced with urea, and ethyl phenylmalonate was replaced with ethyl benzylmalonate.

Example 101

<Manufacture of Polarizer>

In a 500 L tank, 200 kg of water at 18° C. was placed and kept stirred, 42 kg of polyvinyl alcohol-based resin, with a weight-average molecular weight of 165,000 and a degree of saponification of 99.8 mol %, was added, and the mixture was stirred for 15 minutes. The obtained slurry was dewatered to obtain a wet cake of polyvinyl alcohol-based resin with a water content of 40%.

Seventy kilograms of the wet cake of the thus-obtained polyvinyl alcohol-based resin (resin content=42 kg) was placed in a dissolving tank, added with 4.2 kg of glycerin as a plasticizer, 0.42 kg (1.0 parts by mass of the polyvinyl alcohol-based resin) of the compound represented by the formula (1) (A-33), and 10 kg of water, and blown with water vapor from the bottom of the tank. When the internal resin temperature reached 50° C., the mixture started to be stirred (rotating speed=5 rpm), the system was pressurized when the internal resin temperature reached 100° C., the temperature was elevated up to 150° C., and the blowing of water vapor was stopped (total amount of blowing of water vapor=75 kg). The mixture was stirred for 30 minutes (rotating speed=20 rpm) for uniform dissolution, and the concentration was adjusted to thereby obtain an aqueous solution of polyvinyl alcohol-based resin, with a polyvinyl alcohol-based resin concentration relative to water of 23%.

Next, the aqueous solution of polyvinyl alcohol-based resin (at 147° C.) was fed using a gear pump 1 to a twin-screw extruder, defoamed, and then extruded using a gear pump 2. The extruded aqueous solution of polyvinyl alcohol-based resin was cast through a T-slit die (straight manifold die) onto a cast drum for film making. Conditions for film-making by casting are as follow:

Diameter (R1) of cast drum: 3200 mm
Width of cast drum: 4.3 m
Rotating speed of cast drum: 8 m/min
Surface temperature of cast drum: 90° C.
Temperature of resin at output port of T-slit die: 95° C.

The obtained film was then dried while allowing the top surface and the back surface thereof to alternately pass over a plurality of drying rolls.

Diameter (R2) of drying roll: 320 mm
Width of drying roll: 4.3 m
Number of drying rolls (n): 10
Rotating speed of drying roll: 8 m/min
Surface temperature of drying roll: 50° C.

The polyvinyl alcohol film (4000 m long, 4 m wide, and 50 μm thick) manufactured above was immersed in 40° C. warm water for 2 minutes for swelling, and then stretched by a factor of 1.30. The obtained film was immersed into an aqueous solution containing 17.2 g/L of boric acid (from Societa Chimica Larderello S.p.A.), 0.15 g/L of iodine (from Junsei Chemical Co., Ltd.), and 0.6 g/L of potassium iodide (from Junsei Chemical Co., Ltd.) at 30° C. for 2 minutes, for dyeing with the iodide. The thus-dyed film was treated in 50° C. aqueous solution containing 30.0 g/L of boric acid for 5 minutes, while being uniaxially stretched by a factor of 5.0. The obtained film was dried at 70° C. for 9 minutes. Note that the polarizer in this case was only subjected to crosslinking with the boric acid solution of pH4.3 or around, but without any other treatment using an acidic solution.

<<Manufacture of Polarizing Plate>>

(Saponification of Polarizing Plate Protective Film)

Cellulose acetate films from FUJIFILM Corporation (Fujitac TG40, and ZRT40) were immersed in a 2.3 mol/L aqueous sodium hydroxide solution at 55° C. for 3 minutes. The films were washed in a water washing bath at room temperature, and then neutralized at 30° C. with a 0.05 mol/L sulfuric acid. The films were washed again in the water washing bath at room temperature, and then dried under hot air at 100° C. In this way, the surface of the polarizing plate protective films were saponified.

The individual polarizing plate protective films thus saponified were bonded one by one to one side of the polarizer manufactured above in Example 101, using a polyvinyl alcohol-based adhesive. In this process, the transmission axis of the polarizer was aligned orthogonal to the slow axis of the polarizing plate protective film (cellulose triacetate film).

In this way, the polarizing plate of Example 101 was manufactured.

Examples 102 to 109 and Comparative Examples 201 to 204

<<Manufacture of Polarizers of Examples 102 to 109>>

Polarizers of Examples 102 to 109 were manufactured in the same way as Example 101, except that species and amount of addition of the compound, etc. represented by the formula (1) were altered as listed in Table 1 below.

In Table 1, the amount of addition of the compound, etc. represented by the formula (1) is given respectively by the amounts of addition (parts by mass, mmol) per 100 parts by mass of the polyvinyl alcohol resin.

<Manufacture of Polarizers of Comparative Examples 201 to 204>

Polarizers of Comparative Examples 201 to 204 were manufactured in the same way as Example 101, except that the compound, etc. represented by the formula (1) was not added, or the compound, etc. represented by the formula (1) was altered to Comparative Compounds listed in Table 1 below.

<Manufacture of Polarizing Plates of Examples 102 to 107 and Comparative Examples 201 to 204>

Also the polarizing plate protective films used for Examples 102 to 107 and Comparative Examples 201 to 204 were saponified in the same way as Example 101, and the polarizers thus manufactured in Examples and Comparative Examples were laminated according to the embodiments listed in Table 1, to thereby manufacture the polarizing plates of Examples and Comparative Examples.

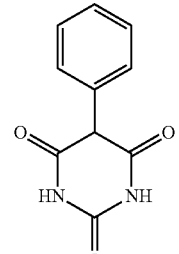

[A-33]

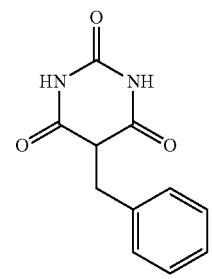

[A-40]

[A-41]
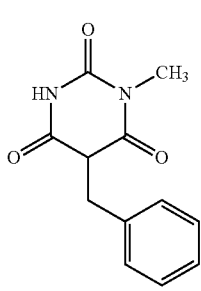

[A-42]
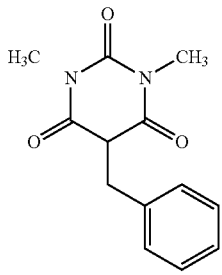

[A-43]
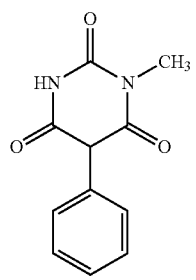

[A-44]
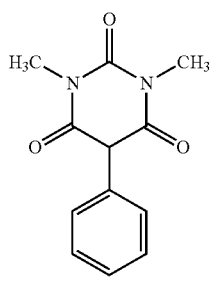

[Comparative Compound (M)]
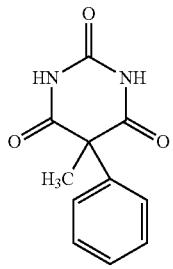

Comparative Compound
N:6-O-palmitoyl-L-ascorbic acid from Tokyo Chemical Industry Co., Ltd.

<<Manufacture of Polarizer of Example 301>>

A polyvinyl alcohol film of 75 μm thick was immersed to be swelled in pure water at 25° C. for 60 seconds, and then stretched by 1.30 times. The thus obtained film was dipped for dyeing in a dying bath containing 0.2 parts by mass of iodine and 5 parts by mass of potassium iodide per 100 parts by mass of water, at 25° C. for 30 seconds, and then stretched by 8 times of the original length while being dipped in a crosslinking bath containing 4.3 parts by mass of boric acid and 3 parts by mass of potassium iodide per 100 parts by mass of water at 60° C. for 80 seconds. The stretched film was dried in an oven at 100° C. for 4 minutes, to thereby manufacture a polarizer.

<<Manufacture of Polarizing Plate of Example 301>>

A polarizing plate protective film of Example 301 was saponified in the same way as described in Example 101, except that Fujitac TD80 was used as the cellulose acetate film (polarizing plate protective film), and bonded to one surface of each of the polarizing plates manufactured in the individual Examples and Comparative Examples. The polarizer herein was arranged so that the transmission axis thereof crosses at right angles with the slow axis of the polarizing plate protective film (cellulose triacetate film).

The compound (A-4) represented by the formula (1) was dissolved in MEK (methyl ethyl ketone) to prepare a 0.17 mol/L solution. The solution was coated using a bar coater on the surface of the polarizing plate, opposite to the surface having the polarizing plate protective film bonded thereto, so as to adjust the amount of coating to 26 cc/m$^2$ (26 ml/m$^2$), and dried at 80° C. for 90 seconds. Content of the compound (A-4) represented by the formula (1) was measured to be 0.1 parts by mass per 100 parts by mass of the polyvinyl alcohol resin.

In this way, a polarizing plate of Example 301, containing the compound represented by the formula (1) in the polarizer, was manufactured.

<<Manufacture of Polarizers of Examples 302 to 307>>

Polarizers of Examples 302 to 307 were manufactured in the same way as Example 301, except that species of the compound, etc. represented by the formula (1), solvent for coating and amount of addition were changed as summarized in Table 2 below.

In Table 2 below, the amount of addition of the compound, etc. represented by the formula (1) is the amount of addition (parts by mass, mmol) per 100 parts by mass of polyvinyl alcohol resin.

<<Manufacture of Polarizer of Example 308>>

A polarizer of Example 308 was manufactured in the same way as Example 301, except that 0.3 parts by mass of a salt of the compound (A-55) represented by the formula (1) was added to the dying bath (hard film solution), and that the coating was not performed. Content of the compound (A-55) represented by the formula (1) was measured to be 0.1 to 30 parts by mass per 100 parts by mass of polyvinyl alcohol resin.

<<Manufacture of Polarizer of Example 309>>

A polarizer of Example 309 was manufactured in the same way as Example 301, except that 0.3 parts by mass of a salt of the compound (A-55) represented by the formula (1) was added to the crosslinking bath, and that the coating was not performed. Content of the compound (A-55) represented by the formula (1) was measured to be 0.1 to 30 parts by mass per 100 parts by mass of polyvinyl alcohol resin.

<<Manufacture of Polarizer of Comparative Example 401>>

A polarizer of Comparative Example 401 was manufactured in the same way as Example 301, except that the compound, etc. represented by the formula (1) was not added.

<<Manufacture of Polarizing Plate of Comparative Example 402>>

A polarizing plate of Comparative Example 402, containing the compound, etc. represented by the formula (I) in the polarizing plate protective film, was manufactured, rather than by adding the compound, etc. represented by the formula (1) to the polarizer.

Making of Cellulose Acylate Film 402

<<<Preparation of Cellulose Acylate Solution 402>>>

The composition below was put in a mixing tank, and stirred to dissolve the individual components, to thereby prepare cellulose acylate solution 402.

| Composition of Cellulose Acylate Solution 402 | |
|---|---|
| Cellulose Acylate, degree of acetyl substitution = 2.87, degree of polymerization = 370 | 100.0 parts by mass |
| Compound (A-4) of present invention | 2.5 parts by mass |
| Hydrophobizing agent 1 (B-1) | 10.5 parts by mass |
| UV absorber D | 1.5 parts by mass |
| Methylene chloride (first solvent) | 412.2 parts by mass |
| Ethanol (second solvent) | 35.8 parts by mass |

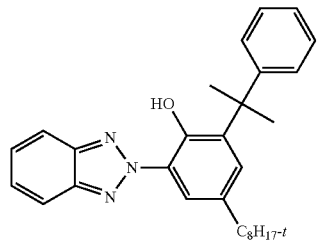

UV Absober D

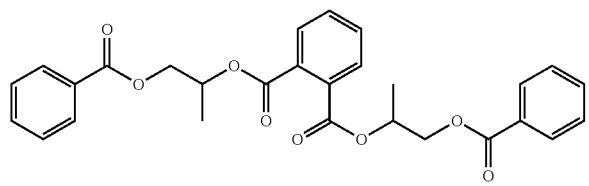

Hydrophobizing Agent (B-1)

<<<Preparation of Matting Agent Solution 102>>>

The composition below was put in a dissolver, and stirred to dissolve the individual components, to thereby prepare matting agent solution 402.

| Composition of Matting Agent Solution 402 | |
|---|---|
| Silica particle, average grain size = 20 nm (Aerosil R972, from Nippon Aerosil, Co., Ltd.) | 2.0 parts by mass |
| Methylene chloride (first solvent) | 79.9 parts by mass |
| Ethanol (second solvent) | 6.9 parts by mass |
| Cellulose acylate solution 402 | 0.9 parts by mass |

<<<Casting>>>

Added were 1.3 parts by mass of the matting agent solution 402 and 98.7 parts by mass of the cellulose acylate solution 402, and mixed using an inline mixer. The thus prepared dope was cast using a band casting machine onto a casting support made of stainless steel (temperature of support=22° C.). The film was peeled off while retaining therein approximately 20% by mass of residual solvent in the dope, held at both edges in the width-wise direction using a tenter, and the film with a content of residual solvent of 5 to 10% by mass was dried at 120° C. while being stretched in the width-wise direction by 1.10 times (10%). The film was further dried by allowing it to travel through rolls of an annealing device, to thereby obtain a cellulose acylate film. The thus obtained cellulose acylate film (polarizing plate protective film) 402 was found to be 80 μm thick and 1,480 mm wide.

A polarizing plate of Comparative Example 402 was manufactured in the same way as Example 301, except that the cellulose acylate film 402 manufactured above was used as the polarizing plate protective film.

<Manufacture of Polarizing Plates of Examples 302 to 309, and Comparative Example 401>

Also the polarizing plate, protective films to be used in Examples 302 to 309 and Comparative Example 401 were respectively saponified in the same way as described in Example 301, and bonded to the polarizer having been manufactured in the individual Examples and Comparative Examples, according to configurations summarized in Table 2, to thereby manufacture the polarizing plates of the individual Examples and Comparative Examples.

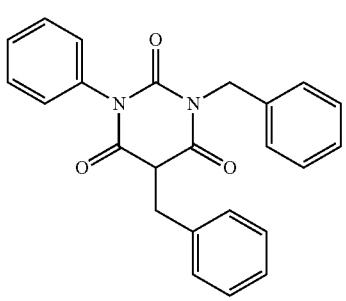

[A-4]

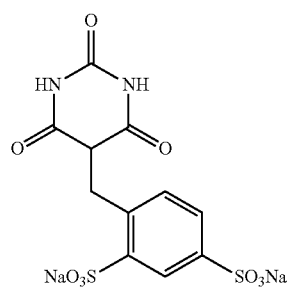

[A-55]

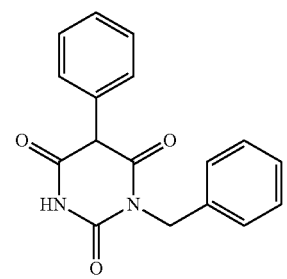

[A-35]

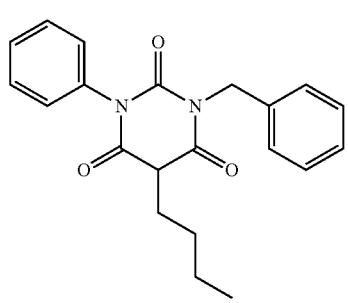

[A-46]

-continued

[A-69]

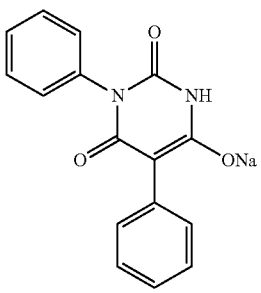

<Evaluation>
<<Evaluation of Durability of Polarizing Plate>>

Cross transmittance of the polarizers of the polarizing plates manufactured above in the individual Examples and Comparative Examples was measured by the method described in this specification, at 410 nm where the degree of degradation is more notable as compared with other wavelength, and at 550 nm where the luminous efficiency is high. The cross transmittance was also measured in the same way at 410 nm and 550 nm, after the polarizing plates were aged in an environment of 60° C. with a relative humidity of 95% for 1000 hours. Changes in the cross transmittance before and after the ageing were determined, and the results were shown in Table below as indices of durability of the polarizers.

TABLE 1

| | Polarizer Compound represented by formula (1) | | | | Protective film | | | |
| | | | Amount of addition | | Glass side | | Air side | |
| | Species | Molecular weight | parts by mass[a] | mmol[a] | Species | Thickness (μm) | Species | Thickness (μm) |
|---|---|---|---|---|---|---|---|---|
| Example 101 | (A-33) | 204 | 1.0 | 4.9 | Fujitac ZRT40 | 40 | Fujitac TG40 | 40 |
| Example 102 | (A-40) | 218 | 1.0 | 4.6 | Fujitac ZRT40 | 40 | Fujitac TG40 | 40 |
| Example 103 | (A-41) | 232 | 1.0 | 4.3 | Fujitac ZRT40 | 40 | Fujitac TG40 | 40 |
| Example 104 | (A-42) | 246 | 1.0 | 4.1 | Fujitac ZRT40 | 40 | Fujitac TG40 | 40 |
| Example 105 | (A-43) | 218 | 1.0 | 4.6 | Fujitac ZRT40 | 40 | Fujitac TG40 | 40 |
| Example 106 | (A-44) | 232 | 1.0 | 4.3 | Fujitac ZRT40 | 40 | Fujitac TG40 | 40 |
| Example 107 | (A-33) | 204 | 0.1 | 0.5 | Fujitac ZRT40 | 40 | Fujitac TG40 | 40 |
| Example 108 | (A-33) | 204 | 10 | 49.0 | Fujitac ZRT40 | 40 | Fujitac TG40 | 40 |
| Example 109 | (A-33) | 204 | 30 | 147 | Fujitac ZRT40 | 40 | Fujitac TG40 | 40 |
| Comparative Example 201 | none | — | 0.0 | 0.0 | Fujitac ZRT40 | 40 | Fujitac TG40 | 40 |
| Comparative Example 202 | Comparative compound (M) | 218 | 1.0 | 4.6 | Fujitac ZRT40 | 40 | Fujitac TG40 | 40 |
| Comparative Example 203 | Citric acid | 192 | 1.0 | 5.2 | Fujitac ZRT40 | 40 | Fujitac TG40 | 40 |
| Comparative Example 204 | Comparative compound (N) | 415 | 0.1 | 0.2 | Fujitac ZRT40 | 40 | Fujitac TG40 | 40 |

| | Characteristics of polarizing plate Durability of polarizing plate | | | | | |
| | Cross transmittance at 410 nm (%) | | | Cross transmittance at 550 nm (%) | | |
| | Before aged | Aged at 65° C., 95% RH, 1000 hr | Difference between pre-ageing and post-ageing values | Before aged | Aged at 65° C., 95% RH, 1000 hr | Difference between pre-ageing and post-ageing values |
|---|---|---|---|---|---|---|
| Example 101 | 0.01 | 0.75 | 0.74 | 0.00 | 0.07 | 0.07 |
| Example 102 | 0.01 | 0.82 | 0.81 | 0.00 | 0.09 | 0.09 |
| Example 103 | 0.01 | 0.84 | 0.83 | 0.00 | 0.10 | 0.10 |
| Example 104 | 0.01 | 0.87 | 0.86 | 0.00 | 0.11 | 0.11 |
| Example 105 | 0.01 | 0.79 | 0.78 | 0.00 | 0.08 | 0.08 |
| Example 106 | 0.01 | 0.80 | 0.79 | 0.00 | 0.09 | 0.09 |
| Example 107 | 0.02 | 1.45 | 1.43 | 0.00 | 0.30 | 0.30 |
| Example 108 | 0.01 | 0.45 | 0.44 | 0.00 | 0.03 | 0.03 |
| Example 109 | 0.01 | 0.32 | 0.31 | 0.00 | 0.02 | 0.02 |
| Comparative Example 201 | 0.08 | 1.65 | 1.57 | 0.00 | 0.39 | 0.39 |
| Comparative Example 202 | 0.08 | 1.69 | 1.61 | 0.00 | 0.41 | 0.41 |

TABLE 1-continued

| | | | | | | |
|---|---|---|---|---|---|---|
| Comparative Example 203 | 0.07 | 1.49 | 1.42 | 0.00 | 0.31 | 0.31 |
| Comparative Example 204 | 0.15 | 2.12 | 1.97 | 0.02 | 0.72 | 0.70 |

[a)] Amount of addition per 100 parts by mass of polyvinyl alcohol resin.

TABLE 2

| | | | Compound represented by formula (1) | | | | |
|---|---|---|---|---|---|---|---|
| | | | Amount of addition | | | Method of addition | |
| | | | parts by | | | | |
| | Species | Molecular weight | mass[a)] | mmol[a)] | mmol/m$^2$ | Method | Solvent |
| Example 301 | (A-4) | 384 | 0.1 | 0.3 | 0.1 | Coating | MEK |
| Example 302 | (A-4) | 384 | 1.0 | 2.6 | 0.6 | Coating | MEK |
| Example 303 | (A-4) | 384 | 29 | 75 | 17 | Coating | MEK |
| Example 304 | (A-4) | 384 | 7.4 | 19 | 4.4 | Coating | MEK |
| Example 305 | (A-35) | 294 | 5.7 | 19 | 4.4 | Coating | Methylene chloride |
| Example 306 | (A-69) | 318 | 6.2 | 19 | 4.4 | Coating | Methanol |
| Example 307 | (A-46) | 350 | 6.8 | 19 | 4.4 | Coating | MEK |
| Example 308 | (A-55) | 350 | | — | | Added to the dying bath | — |
| Example 309 | (A-55) | 350 | | — | | Added to the crosslinking bath | — |
| Comparative Example 401 | None | 384 | 0.0 | 0.0 | 0.0 | — | — |
| Comparative Example 402 | (A-4) | 384 | — | — | 4.4 | Added to the protected film | — |

| | Characteristics of polarizing plate Durability of polarizing plate | | | | | |
|---|---|---|---|---|---|---|
| | Cross transmittance at 410 nm (%) | | | Cross transmittance at 550 nm (%) | | |
| | Before aged | Aged at 65° C. 95% RH, 1000 hr | Difference between pre-ageing and post-ageing values | Before aged | Aged at 65° C., 95% RH, 1000 hr | Difference between pre-ageing and post-ageing values |
| Example 301 | 0.02 | 0.32 | 0.29 | 0.001 | 0.005 | 0.004 |
| Example 302 | 0.03 | 0.07 | 0.04 | 0.001 | 0.001 | 0.000 |
| Example 303 | 0.03 | 0.04 | 0.01 | 0.001 | 0.000 | −0.001 |
| Example 304 | 0.03 | 0.04 | 0.02 | 0.001 | 0.001 | 0.000 |
| Example 305 | 0.02 | 0.09 | 0.07 | 0.001 | 0.001 | 0.000 |
| Example 306 | 0.02 | 0.16 | 0.14 | 0.002 | 0.005 | 0.002 |
| Example 307 | 0.02 | 0.17 | 0.15 | 0.001 | 0.002 | 0.001 |
| Example 308 | 0.02 | 0.12 | 0.09 | 0.002 | 0.002 | 0.000 |
| Example 309 | 0.01 | 0.06 | 0.05 | 0.002 | 0.002 | 0.000 |
| Comparative Example 401 | 0.03 | 0.42 | 0.39 | 0.001 | 0.009 | 0.008 |
| Comparative Example 402 | 0.03 | 0.14 | 0.11 | 0.001 | 0.002 | 0.001 |

[a)] Amount of addition per 100 parts by mass of polyvinyl alcohol resin.
*Amount of addition in Examples 301 to 309 is amount of addition of the compound represented by the formula (1) added to the polarizer, whereas amount of addition in Comparative Example 402 is amount of addition of the compound represented by the formula (1) added to the polarizing plate protective film.

It was found from the results listed in Table 1 and Table 2, that the polarizing plate of the present invention, which uses the polarizer of the present invention containing the compound, etc. represented by the formula (1), was less likely to cause degradation of the polarizer even after allowed to stand the under high-temperature and high-humidity condition.

In contrast, the polarizing plate of Comparative Examples 201 and 401 configured without using the compound, etc. represented by the formula (1), the polarizing plate of Comparative Example 202, the polarizing plate of Comparative Example 203 containing citric acid, and the polarizing plate of Comparative Example 204 containing 6-O-palmitoyl-L-ascorbic acid were found to cause considerable degradation of the polarizers after allowed to stand under the high-temperature and high-humidity condition. It was also found, referring to Examples 301 and 302, that the Examples exhibited the effect of the present invention, only with an amount of the compound of the present invention smaller by approximately one digit than Comparative Example 402 which contains the compound in the polarizing plate protective film.

From the results described above, it was confirmed that a liquid crystal display device showing good visibility even after allowed to stand in high temperatures and high humidity, is manufacturable by using the polarizing plate having incorporated therein the polarizer layer containing the compound of the present invention.

The present disclosure relates to the subject matter contained in Japanese Patent Application Nos. 036539/2013, filed on Feb. 27, 2013 and 020394/2014, filed on Feb. 5, 2014, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

The invention claimed is:

1. A polarizer comprising a polyvinyl alcohol-based resin, a dichroic colorant, and at least one species selected from the group consisting of a compound represented by formula (1), a compound represented by formula (1-2), a hydrate of the compounds, a solvate of the compounds, and a salt of the compounds, the total content of the compound represented by the formula (1), the compound represented by the formula (1-2), the hydrate of the compounds, the solvate of the compounds, and the salt of the compounds being 0.01 to 30 parts by mass relative to 100 parts by mass of the polyvinyl alcohol-based resin;

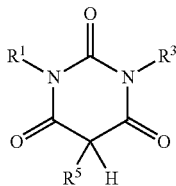

Formula (1)

in the formula (1), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group or $C_{6-20}$ aromatic group, and $R^5$ represents an alkyl group or an aralkyl group;

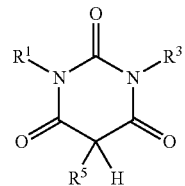

Formula (1-2)

in the formula (1-2), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group, or, $C_{6-20}$ aromatic group, and $R^5$ represents an alkyl group or an aralkyl group; where at least one of $R^1$, $R^3$ and $R^5$ is a water-soluble group, or contains a water-soluble group, or both of $R^1$ and $R^3$ represent a hydrogen atom.

2. The polarizer of claim 1, wherein $R^5$ represents an aralkyl group.

3. The polarizer of claim 1, wherein $R^5$ represents a phenyl group or benzyl group.

4. A polarizing plate comprising the polarizer described in claim 1, and a protective film formed on at least one surface of the polarizer.

5. The polarizing plate of claim 4, wherein the protective film is a cellulose acylate film.

6. A liquid crystal display device comprising the polarizing plate of claim 4.

* * * * *